US011987429B2

(12) United States Patent
Darst et al.

(10) Patent No.: US 11,987,429 B2
(45) Date of Patent: May 21, 2024

(54) PILL CONTAINER AND METHODS

(71) Applicant: Apothecary Products, LLC, Burnsville, MN (US)

(72) Inventors: Daniel Darst, Zimmerman, MN (US); Jennifer Joy Kallemeyn, Savage, MN (US)

(73) Assignee: Apothecary Products, LLC

( * ) Notice: Subject to any disclaimer, the term of this patent is extended or adjusted under 35 U.S.C. 154(b) by 301 days.

(21) Appl. No.: 17/496,450

(22) Filed: Oct. 7, 2021

(65) Prior Publication Data

US 2022/0112010 A1 Apr. 14, 2022

Related U.S. Application Data

(60) Provisional application No. 63/089,623, filed on Oct. 9, 2020.

(51) Int. Cl.

| | |
|---|---|
| ***A61J 1/03*** | (2023.01) |
| ***B65D 25/04*** | (2006.01) |
| ***B65D 43/16*** | (2006.01) |
| ***B65D 50/04*** | (2006.01) |
| ***B65D 55/10*** | (2006.01) |

(52) U.S. Cl.

CPC .............. *B65D 50/045* (2013.01); *A61J 1/03* (2013.01); *B65D 25/04* (2013.01); *B65D 43/16* (2013.01); *B65D 55/10* (2013.01); *B65D 2215/02* (2013.01)

(58) Field of Classification Search

CPC ........................................................ A61J 1/03

See application file for complete search history.

(56) References Cited

U.S. PATENT DOCUMENTS

| | | | |
|---|---|---|---|
| 4,057,145 A | 11/1977 | Wray et al. | |
| 5,782,359 A | 7/1998 | Mcallister et al. | |
| 6,631,805 B2 | 10/2003 | Bramen | |
| D850,782 S | 6/2019 | Lee et al. | |
| 10,420,703 B1 | 9/2019 | Lee | |

(Continued)

FOREIGN PATENT DOCUMENTS

| | | | |
|---|---|---|---|
| EP | 1053955 A2 | 11/2000 | |
| WO | WO-2014008638 A1 * | 1/2014 | ................ A61J 1/03 |
| WO | 2019007799 A1 | 1/2019 | |

OTHER PUBLICATIONS

International Search Report and Written Opinion for PCT/US2021/054020 dated Mar. 21, 2022, 20pgs.

*Primary Examiner* — Eyamindae C Jallow

(74) *Attorney, Agent, or Firm* — Merchant & Gould P.C.

(57) ABSTRACT

A child resistant pill container includes a locking feature, which can be unlocked using a knob. The knob can be a rotatable knob or a slide knob. The knob will be fixed or locked in place until being released/unlocked by squeezing an actuator. The squeeze action allows the knob to move out of its fixed position and move by either rotation or linearly sliding. The motion of the knob moves a lock bar from its locked position to an unlocked position. While the lock bar is in the unlocked position, one or more of the lids can be unlatched and lifted from their closed position to an open position. When the knob is released, a spring action returns the knob back to the fixed (locked) position, moving the lock bar back into the locked position, and any lids still in the closed position are again locked in place.

19 Claims, 42 Drawing Sheets

(56) References Cited

U.S. PATENT DOCUMENTS

| | | | | |
|---|---|---|---|---|
| 2003/0205496 | A1* | 11/2003 | Howard | B65D 83/0454 206/538 |
| 2005/0205595 | A1 | 9/2005 | Lepke et al. | |
| 2007/0261985 | A1 | 11/2007 | Allen | |
| 2009/0114562 | A1 | 5/2009 | Noble et al. | |
| 2011/0101018 | A1 | 5/2011 | Shafir | |
| 2013/0056385 | A1* | 3/2013 | Thompson | A61J 7/04 206/534 |
| 2014/0251863 | A1* | 9/2014 | Priebe | A61J 1/03 206/534 |

* cited by examiner

PILL CONTAINER AND METHODS

CROSS-REFERENCE TO RELATED APPLICATION

This application claims the benefit of U.S. Provisional Patent Application No. 63/089,623, filed Oct. 9, 2020; the disclosure of which is incorporated herein by reference in its entirety.

TECHNICAL FIELD

This disclosure relates generally to containers with hinged mating lids, often used for holding medicine, such as pills. In particular, this disclosure relates to containers having child resistant features and methods of opening such containers.

BACKGROUND

Containers with hinged mating lids are well known. Some containers can include multiple compartments. See, for example, commonly assigned U.S. Pat. No. 7,624,890, incorporated herein by reference.

When these containers hold medicine or vitamins, it is helpful to have features that will not allow a child to easily access the contents, for safety reasons. While there are pill containers that are considered child-deterrent, improvements are desirable for containers that are child resistant per the standard of US 16 CFR 1700.15.

SUMMARY

In general, this disclosure is directed to pill containers that are an improvement over the prior art.

In general, the improved pill containers will do at least one, and preferably all, of the following functions: (i) prevent children from accessing the contents of compartments in the pill container; (ii) after opening one container by releasing a lid, automatically locking all non-open lids; and (iii) to close any open lid, requiring an actuator to be moved into an "unlock position" first.

A container includes: (a) a base having surrounding wall defining a cavity with an interior volume; (b) a lid pivotably attached to the base and sized to removably cover the cavity so that the lid is movable between a closed position covering the cavity and an open position exposing the cavity; (c) a locking mechanism to control locking and unlocking of the lid to the base; and (d) an actuator to move the locking mechanism from the locked position to unlocked position.

In preferred implementations, the container includes (a) a plurality of subcavities within the base, and a plurality of lids; one lid for each of the subcavities; (b) the locking mechanism controls locking and unlocking of all of the lids to the base; and (c) the actuator biasing the locking mechanism into the locked position, such that when released, the actuator locks all lids that are covering their respective subcavity.

Preferably, the actuator is constructed and arranged such that, to move one of the lids from the open position to the closed position, the actuator must be moved against the bias into the unlocking position.

In example embodiments, the lid has a first member of a hook and catch arrangement to selectively secure the lid to the base, when the lid is in the closed position, and selectively release the lid from the base; and (ii) the base has a second member of a hook and catch arrangement to selectively secure the lid to the base, when the lid is in the closed position, and selectively release the lid from the base.

In many embodiments, a lock bar is slidably engaging with the second member of the hook and catch arrangement; the lock bar being movable between a locked position locking the lid to a secure position to the base, and an unlocked position releasing the lid from the base.

Preferably, the actuator comprises a knob having a squeeze actuator to release the knob from a fixed position to allow the knob to move and push on the lock bar to urge the lock bar from the locked position to unlocked position.

In some examples, the knob moves rotationally after released from the fixed position.

In some examples, the knob slides linearly after released from the fixed position.

The knob may include a spring that returns the knob to the fixed position.

Many implementations include the spring as a torsion spring.

Preferably, the knob includes a spring-retaining aperture constructed and arranged to receive a portion of the torsion spring and retain the torsion spring in place.

Some embodiments include the container includes a plurality of subcavities within the base, and a plurality of lids; one lid for each of the subcavities.

In some embodiments, the base and lid are each shaped to be a partial cylinder.

In one or more embodiments, the knob includes an internal ramp; and the lock bar engages against the ramp as the knob is moved from the fixed position resulting in the lock bar sliding in a direction parallel to a longitudinal axis of the base to the unlocked position.

The lock bar can include at least one notch corresponding to each hook and catch arrangement; and when the lock bar is in the locked position, the notch is engaged with a projection on one of the first or second members of the hook and catch arrangement, and when the lock bar is in the unlocked position, the notch is free of engagement with the projection.

In examples, the squeeze actuator includes a pair of opposite outwardly facing knurled surfaces; and a pair of inwardly extending ribs.

In another aspect, a method of opening a container locked closed with a lock bar is provided. The method comprising: (a) grasping a knob and moving the knob from a fixed position to a released position by squeezing a squeeze actuator on the knob; (b) moving the knob to move the lock bar from a locked position to an unlocked position; and (c) while still grasping the knob, moving a lid from a closed position to an open position to expose an open cavity in the container.

Preferably, the step of moving a lid includes lifting the lid to release engagement of a secondary latch arrangement between the lid and a base of the container.

In some examples, the step of moving the knob includes rotating the knob.

In some examples, the step of moving the knob includes linearly moving the knob.

Some methods having the step of linearly moving the knob will include sliding the knob relative to a sidewall of the container.

Some methods further comprise releasing the knob and permitting the knob to spring back to the fixed position, and permitting the lock bar to spring back to the locked position.

Preferably, the container includes a plurality of subcavities and a plurality of lids; one lid for each of the subcavities; and the step of moving the knob to move the lock bar from a locked position to an unlocked position controls locking and unlocking of all of the lids to the base.

The method can include moving the lid from the open position to the closed position by moving the knob to move the lock bar from the locked position to the unlocked position; and while still grasping the knob, moving the lid from the open position to the closed position.

A variety of examples of desirable features or methods are set forth in part in the description that follows, and in part will be apparent from the description, or may be learned by practicing various aspects of the disclosure. The aspects of the disclosure may relate to individual features as well as combinations of features. It is to be understood that both the foregoing general description and the following detailed description are explanatory only, and are not restrictive of the claimed invention.

DETAILED DESCRIPTION

Pill containers described herein have a locking mechanism that meets a child-resistant protocol, as specified in Federal Regulations, such as 16 CFR 1700.15. The pill containers have a secure closure to avoid compartments opening or spilling when dropped. They are easy to open for those with dexterity issues (Ease of Use from Arthritis Foundation). They are made from food-grade, BPA plastic. They last through multiple uses without tabs breaking off, compartments not closing, etc.

In general, the pill containers described herein will do at least one, and preferably all, of the following functions: (i) prevent children from accessing the contents of compartments in the pill container; (ii) after opening one container by releasing a lid, automatically locking all non-open lids; and (iii) to close any open lid, requiring an actuator to be moved into an "unlock position" first.

In preferred non-limiting examples, the pill container examples disclosed herein include a locking mechanism (e.g., a lock bar), which either locks or releases one or more lids of the container. An actuator (e.g., a knob) is actuated to move the lock bar from the locked position to an unlocked position, releasing one or more of the lids. The actuator preferably automatically locks all unopened containers, and/or it preferably needs to be moved to the "release" or "unlock" position to re-close any open containers.

FIGS. 1-10 are directed to a first embodiment, in which to open the lids, the knob is squeezed and rotated, and the lids can opened independently by lifting each lid to release each lid from a secondary latch arrangement. There is a built in return spring so that when the knob is released, the knob will return to a fixed position, locking all remaining closed lids. The embodiment of FIGS. 11-29 is similar to embodiment of FIGS. 1-10, but do not use a torsion spring as the return spring. The embodiment of FIGS. 30-40 includes the knob being moved linearly instead of rotated. The embodiment of FIGS. 41-50 is a similar concept, in that the end knob is squeezed and rotated, which will allow the enclosure to open. The enclosure of FIGS. 41-50 can be used to store a pill box, or round pill boxes, or any of a variety of items. The embodiment of FIGS. 54-62 is similar to the embodiment of FIGS. 1-10 and includes some additional features for added strength and functionality.

A pill container in accordance with principles of this disclosure is shown in general at 100. The container 100 can be used for the convenient storage of a variety of materials, including pills, medicines, vitamins, and the like. The container 100 can also be used to store any other small items such as buttons, screws, fasteners, sequins, or other various materials.

Figure 51:
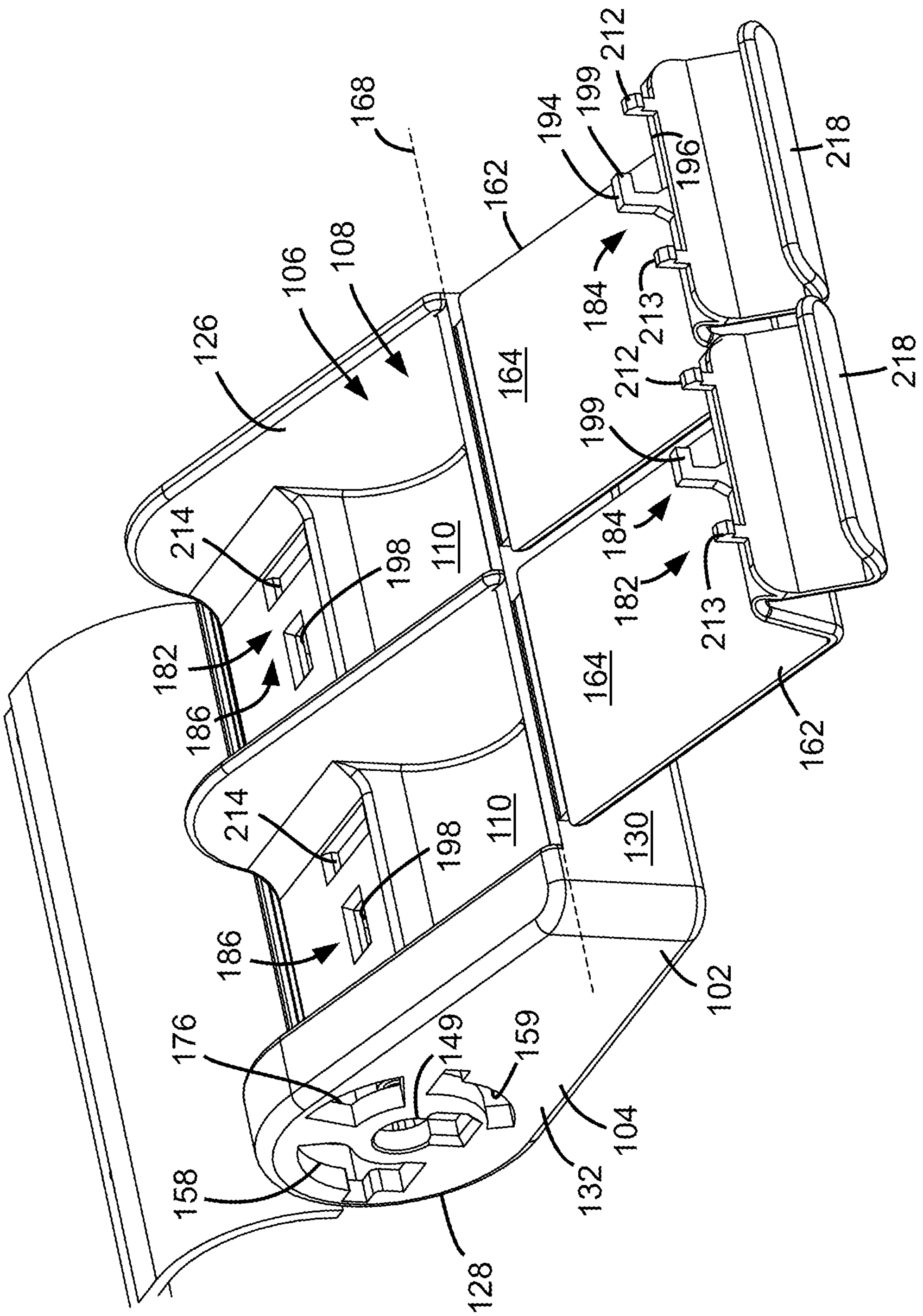
FIG. 51 is a perspective view of a portion of the containers of FIGS. 1-40, showing the lids in an open position.

An example embodiment, representative of each of the embodiments of FIGS. 1-40, is shown in FIGS. 1, 11, 30, 41, 51, and 54. It should be noted that FIG. 51 shows a representative container 100, but with only two cavities. It should be understood that in FIG. 51, there can be 7 or more cavities, like that shown in FIGS. 1 and 11.

Example Base

The container 100 includes a base 102. The base 102 has a surrounding wall 104 which defines a cavity 106 (FIG. 51, 60) with an interior volume 108. The cavity 106 is for holding the contents of the container 100.

While many different configurations are possible, in the example shown, the surrounding wall 104, in this embodiment, includes a front wall 128, an opposite back wall 130, a first side wall 132, and a second side wall 134 opposing the first side wall 132. The first and second side walls 132, 134 extend between the front wall 128 and back wall 130. A bottom 124 (FIG. 53) forms the bottom surface of the base 102.

Figure 53:
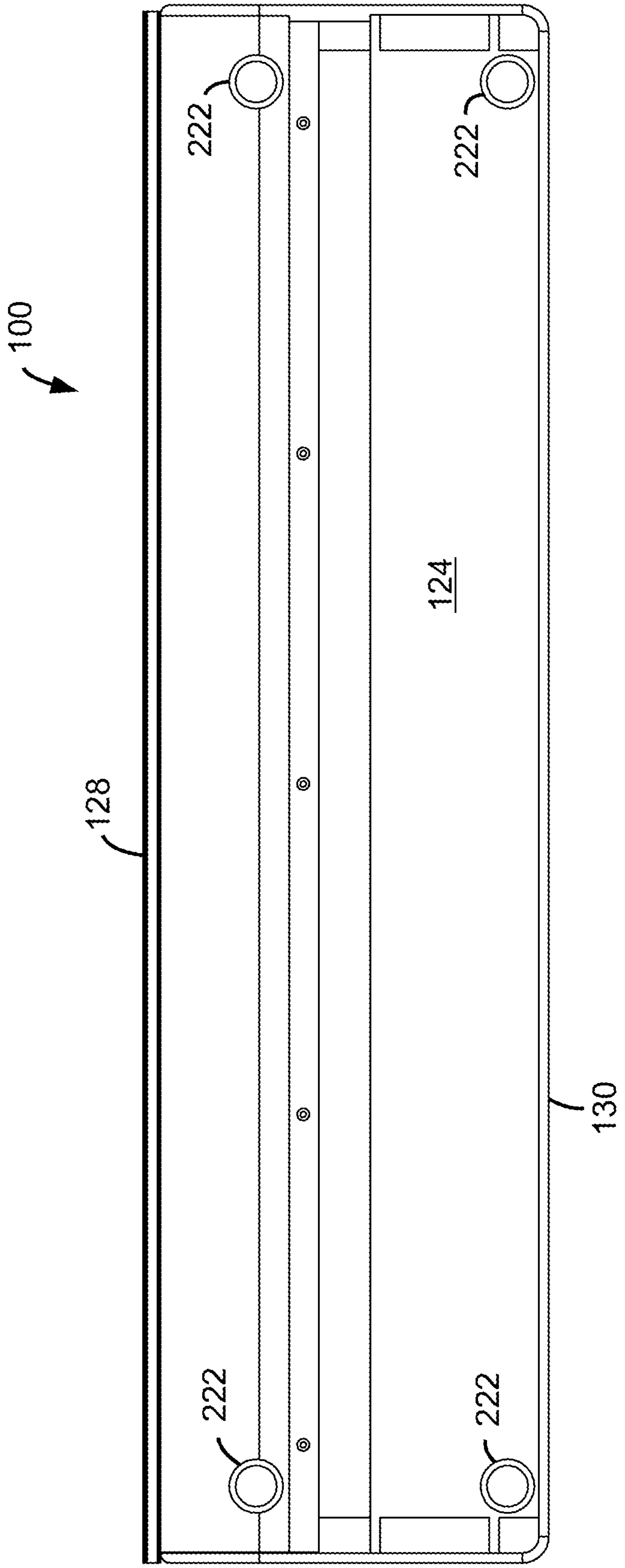
FIG. 53 is a bottom plan view of the containers of FIGS. 1-40.
Figure 54:
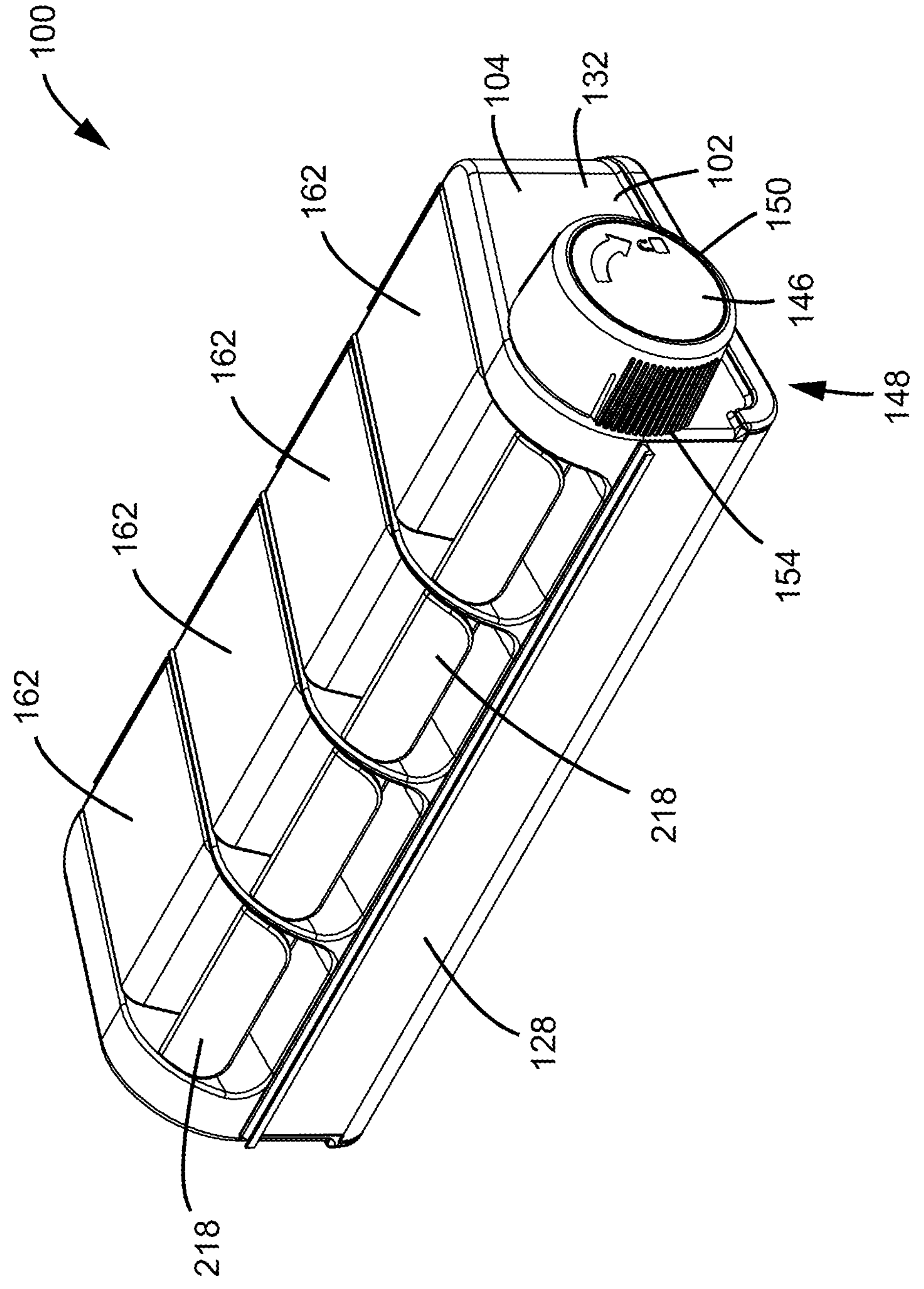
FIG. 54 is a top perspective view of another embodiment of a pill container in the closed position.
Figures 55, 56:
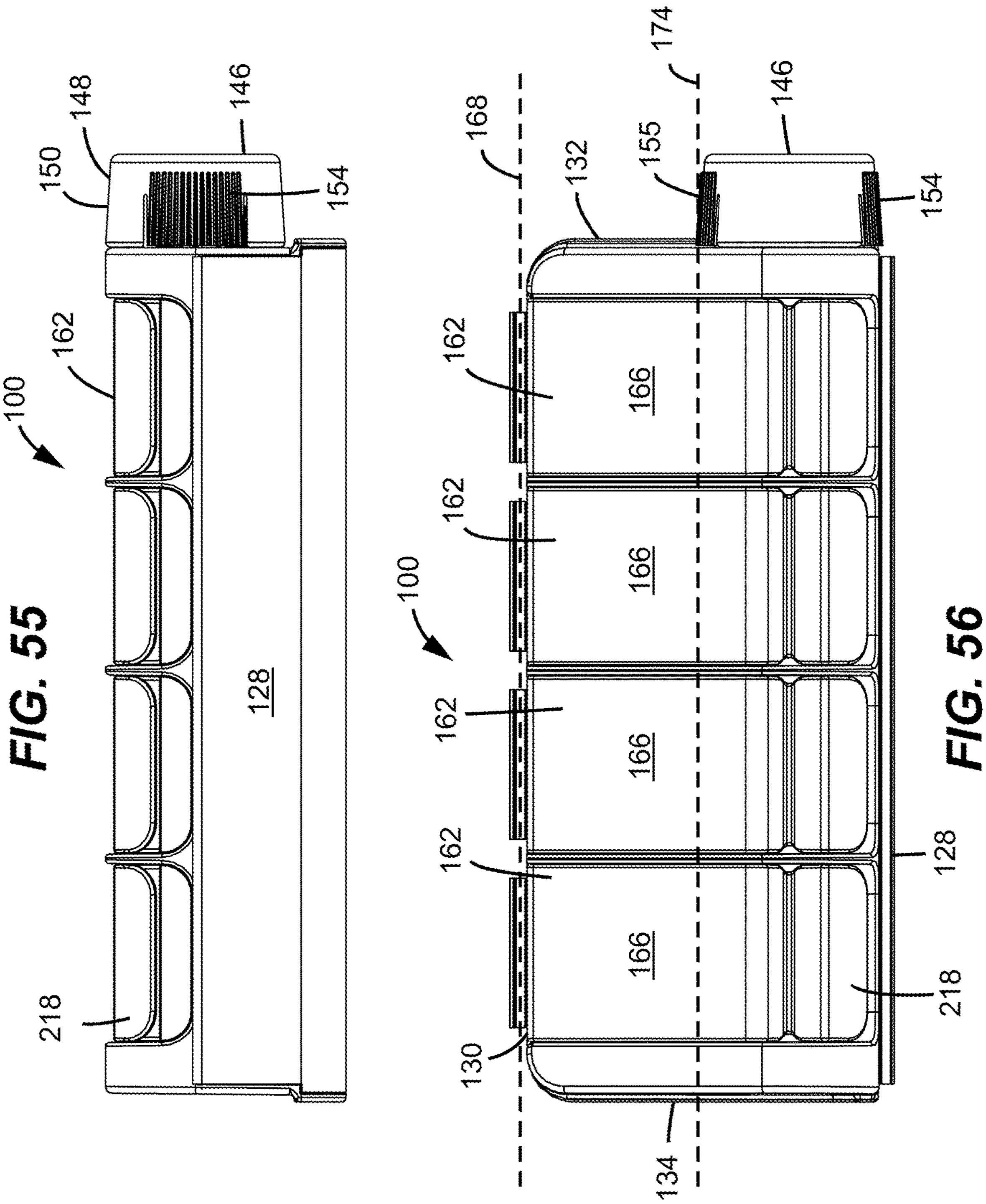
FIG. 55 is a front view of the pill container of FIG. 54.
FIG. 56 is a top plan view of the pill container of FIG. 54.
Figure 57:
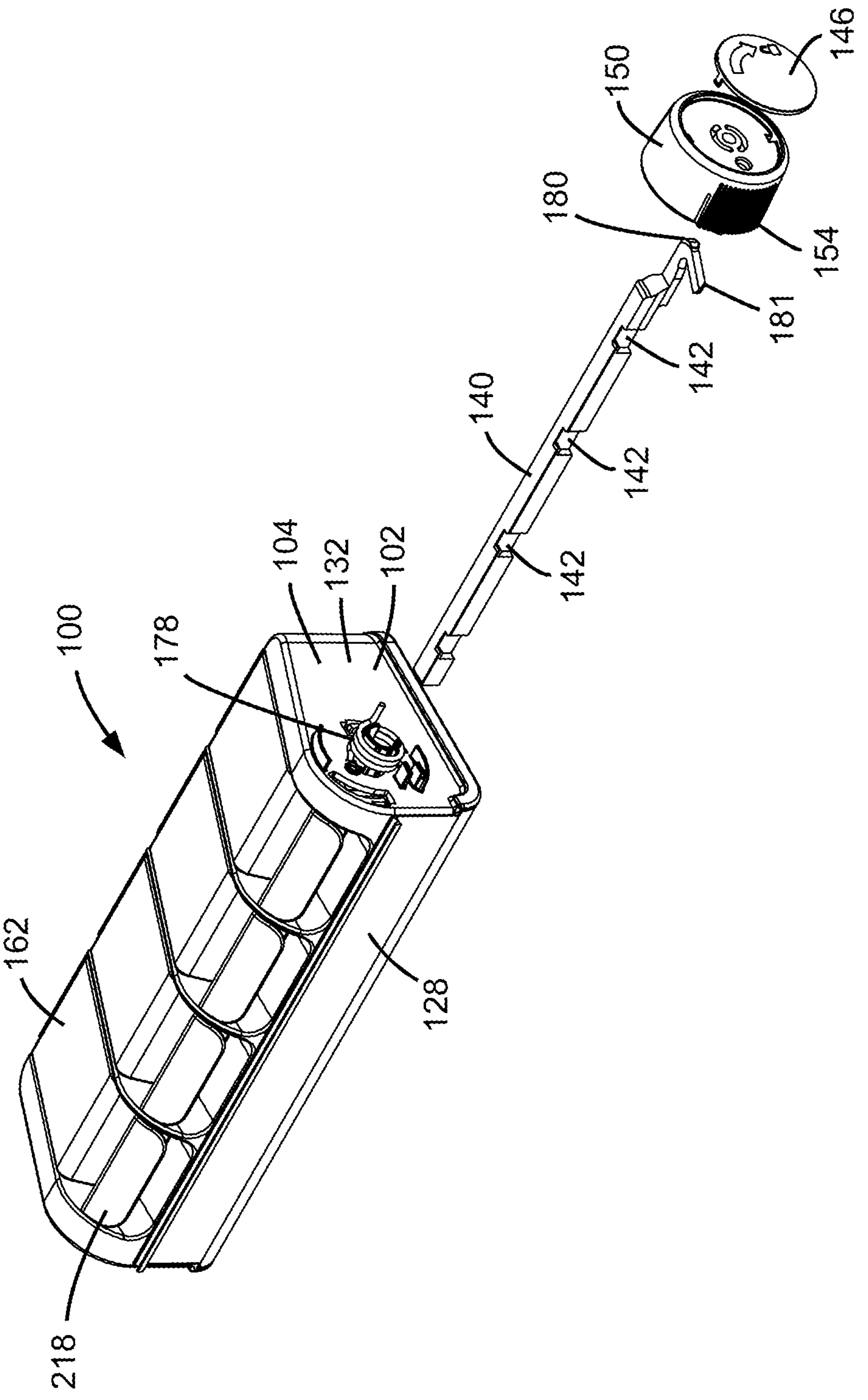
FIG. 57 is an exploded, perspective view of the pill container of FIG. 54.

In FIG. 53, a bottom plan view of the container 100 is shown, and the bottom 124 is visible. The bottom 124 includes a plurality of feet 222 extending therefrom. The feet 222 will preferably be covered by a friction-enhancing material, such as silicone pads. In this case, there are 4 feet 222, adjacent to each corner of the container 100. In use, the container 100 will rest on the feet 222, with the silicone pads providing slip resistance. As will be described further below, to open the container 100, two hands are used, so it is helpful to have the container 100 to have the slip-resistant feet 222.

In the embodiment of FIGS. 41-50, the container 100 can either be used empty, or it can hold a pill container of any shape, including a cylinder shaped pill container 190. One or more cylinder shaped containers 190 can be stored within the cavity 106 of the container 100.

Example Lid

In accordance with principles of this disclosure, the container 100 further includes a lid 162. The lid 162 is sized to removably cover the cavity 106 over the mouth 126 so that the lid 162 is movable between a closed position covering the cavity 106 (FIG. 1) and an open positon (FIG. 51) exposing the cavity 106. The lid 162 has an interior surface 164, which faces the cavity 106, when the lid 162 is in the closed position. The lid 162 has an opposite exterior surface 166 (FIG. 1), which always faces away from the cavity 16.

Still in reference to FIG. 51, the lid 162 is secured to the back wall 130 of the base 102. While many examples are possible, in the one shown, the lid 162 is pivotably secured to the back wall 130 of the base 102. In this example, the lid 162 is secured to the back wall 130 along a hinge line or hinge axis 168 so that the lid 162 can pivot between a closed position (covering the cavity 106) and an open position (allowing access to the interior volume 108 of the cavity 106). The hinge axis 168 is generally parallel to a longitudinal axis 174 (FIG. 3, 56) of the container 100. The longitudinal axis 174 passes through both the first side wall 132 and second side wall 134.

In the embodiments of FIGS. 1-10, 11-29, 30-40, and 54-62 the container 100 includes a plurality of sub-cavities 110 (FIG. 51) within the base 102. Each sub-cavity 110 functions as an individual compartment to hold pills, for example. A plurality of lids 162 are provided, with one lid 162 for each of the sub-cavities 110. In the embodiment of FIGS. 41-50, the base 102 and lid 162 are each shaped to be a partial cylinder, such as roughly a half cylinder. The sub-cavities 110 (FIG. 51) are smoothly contoured and shaped to allow for ease of scooping out pills. In the embodiment of FIGS. 1-10, there are 7 sub-cavities 110, while in the embodiment of FIGS. 54-62, there are 4 sub-cavities 110. It should be understood there can be fewer than 4 and more than 7, in other embodiments.

Figure 60:
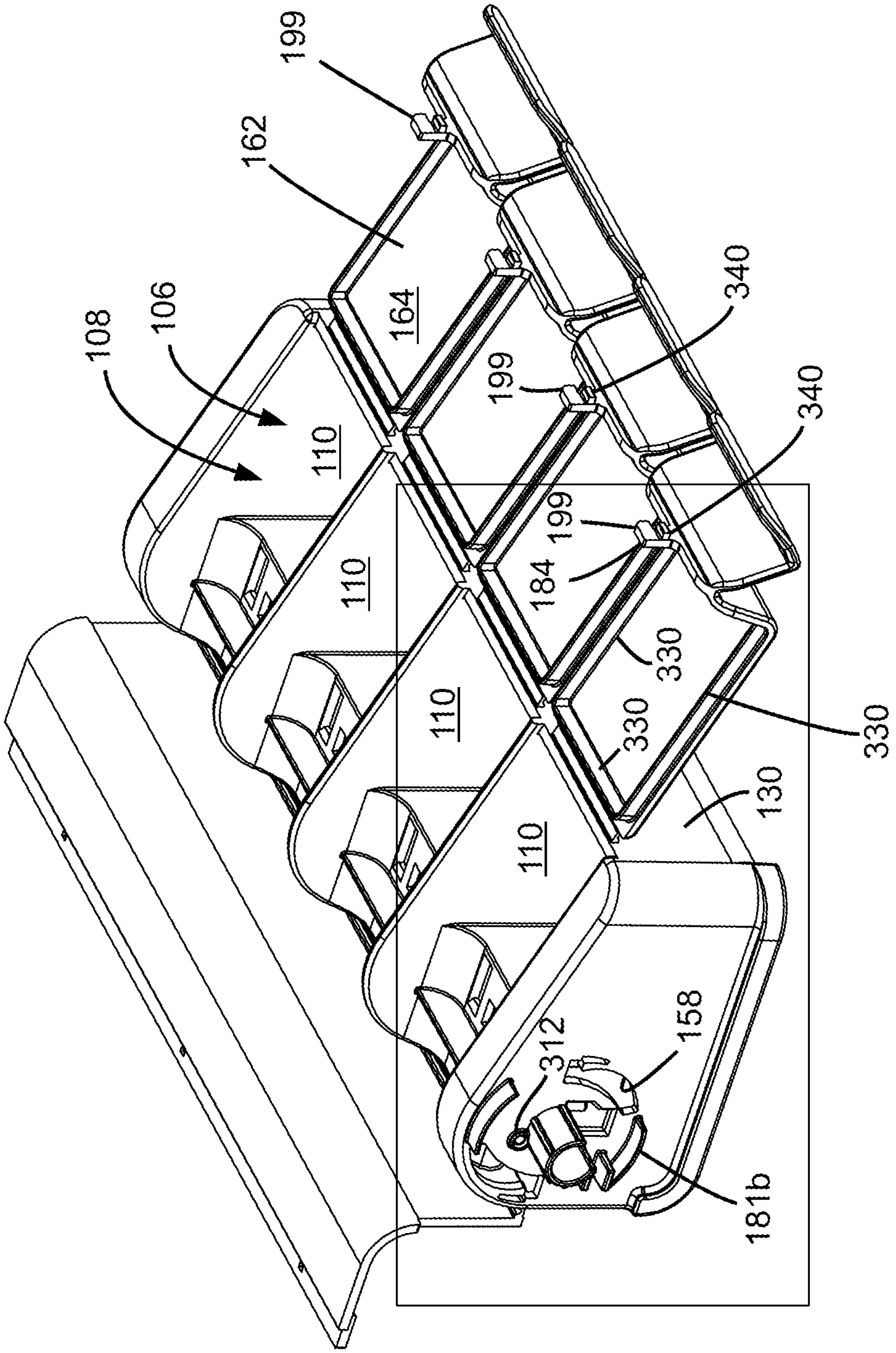
FIG. 60 is a perspective view of the pill container of FIG. 54 with all the lids shown in an open position, and a front panel moved from the container.

In FIG. 60, the lids 162 include ribs 330 along an outer periphery of the interior surface 164 to help with strength and rigidity.

Example Hook and Catch Arrangement

The lid 62 and the base 102 include a hook and catch arrangement 182, shown in FIG. 51. The FIG. 51 embodiment shows only two cavities 106, but is representative of each of the containers 100 shown in FIGS. 1-40. In FIG. 51, the lid 162 includes a first member 184 of the hook and catch arrangement 182, while the base 102 has a second member 186 of the hook and catch arrangement 182. The hook and catch arrangement 182 allows for selective locking of the lid 162 to the base 102, and selective unlocking of the lid 162 from the base 102. When the lid 162 is unlocked from the base 102, the lid 162 can be lifted from the base 102 to move the lid 162 from the closed position to the open position.

Still in reference to FIG. 51, the hook and catch arrangement 182 includes a hook and a catch. The hook and catch can be on either the lid 162 or the base 102. In the particular example shown, the first member 184 of the hook and catch arrangement 182 is a hook 194 projecting from a free end 196 of the lid 162. The second member 186 of the hook and catch arrangement 182 is a catch 198 within the base 102 and adjacent to the front wall 128 of the surrounding wall 104 the base 102.

Figure 1:
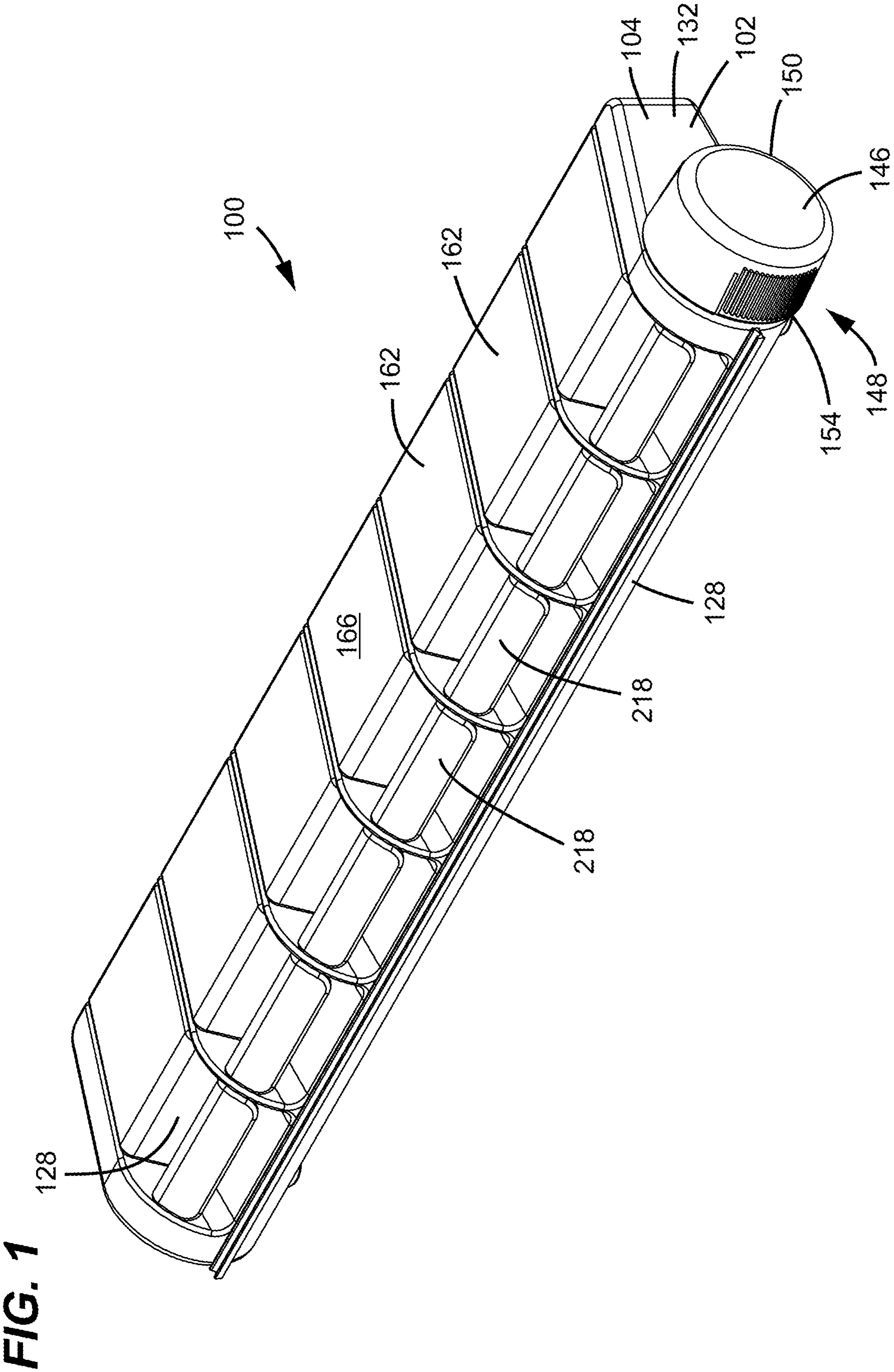
FIG. 1 is a top perspective view of an embodiment of a pill container in the closed position.

When the lid 162 is in the closed position of FIG. 1, the hook 194 is located within the catch 198 to lock or hold the lid 162 in place.

Still in reference to FIG. 51, there is a projection 199 extending from one of the first or second members 184, 186 of the hook and catch arrangement 182. The projection 199 interacts with a lock bar 140, as explained further below. In the example embodiment shown, the projection 199 extends from the hook 194.

Figure 61:
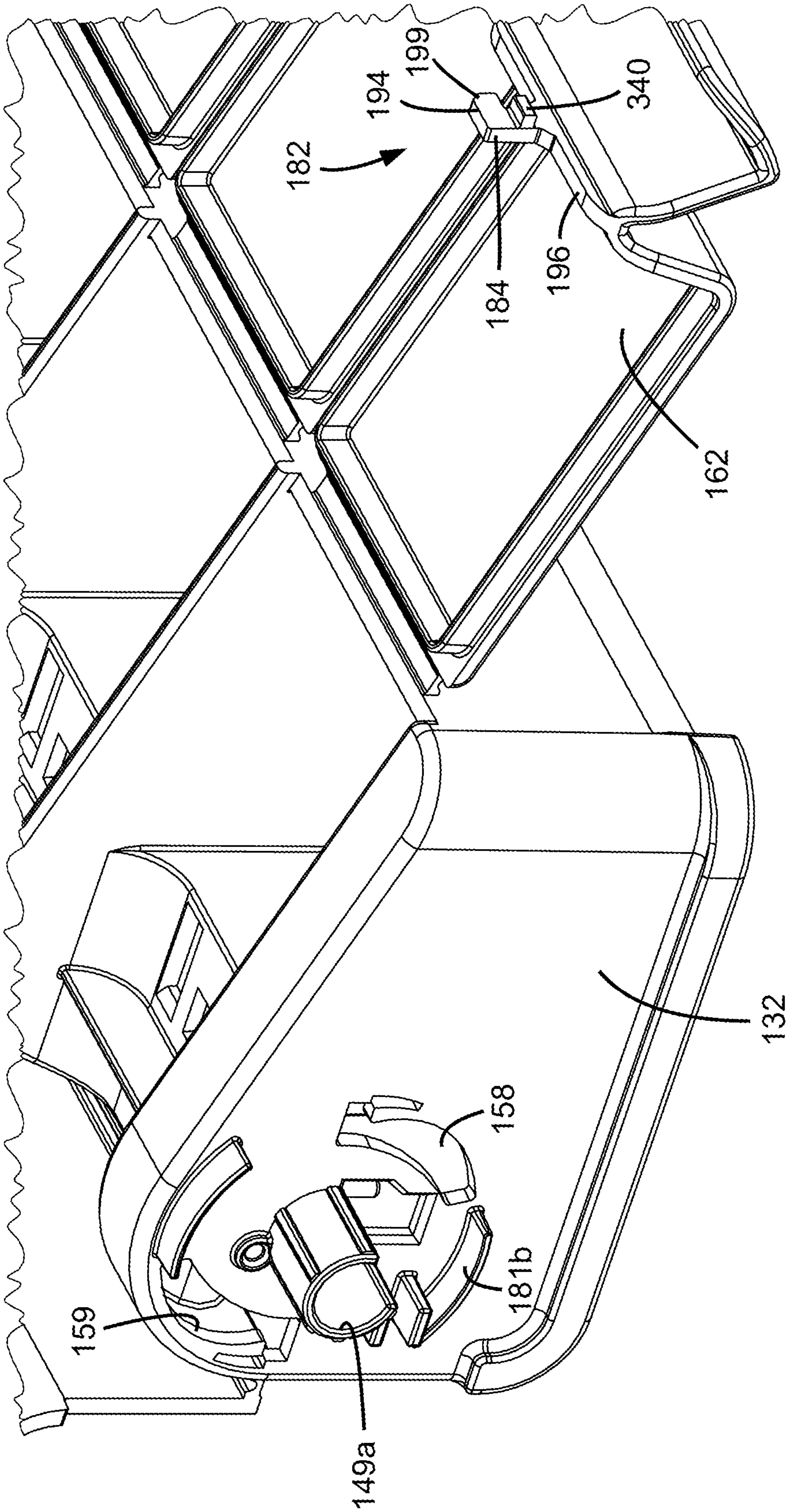
FIG. 61 is a perspective view of an enlarged portion of an end of the pill container of FIG. 60.

In FIGS. 60 and 61, the first member 184 further includes a keeper 340 projecting along a plane perpendicular to the plane containing the hook 194. When the lid 162 is in a closed position, the keeper 340 extends outwardly away from and perpendicular to the front wall 128. The keeper 340 helps with retention of the lids 162 in a closed position to prevent the lids 162 from popping open or up.

Example Locking Mechanism

The container 100 includes a locking mechanism to control locking and unlocking of the lid 162 to the base 102.

Figure 2:
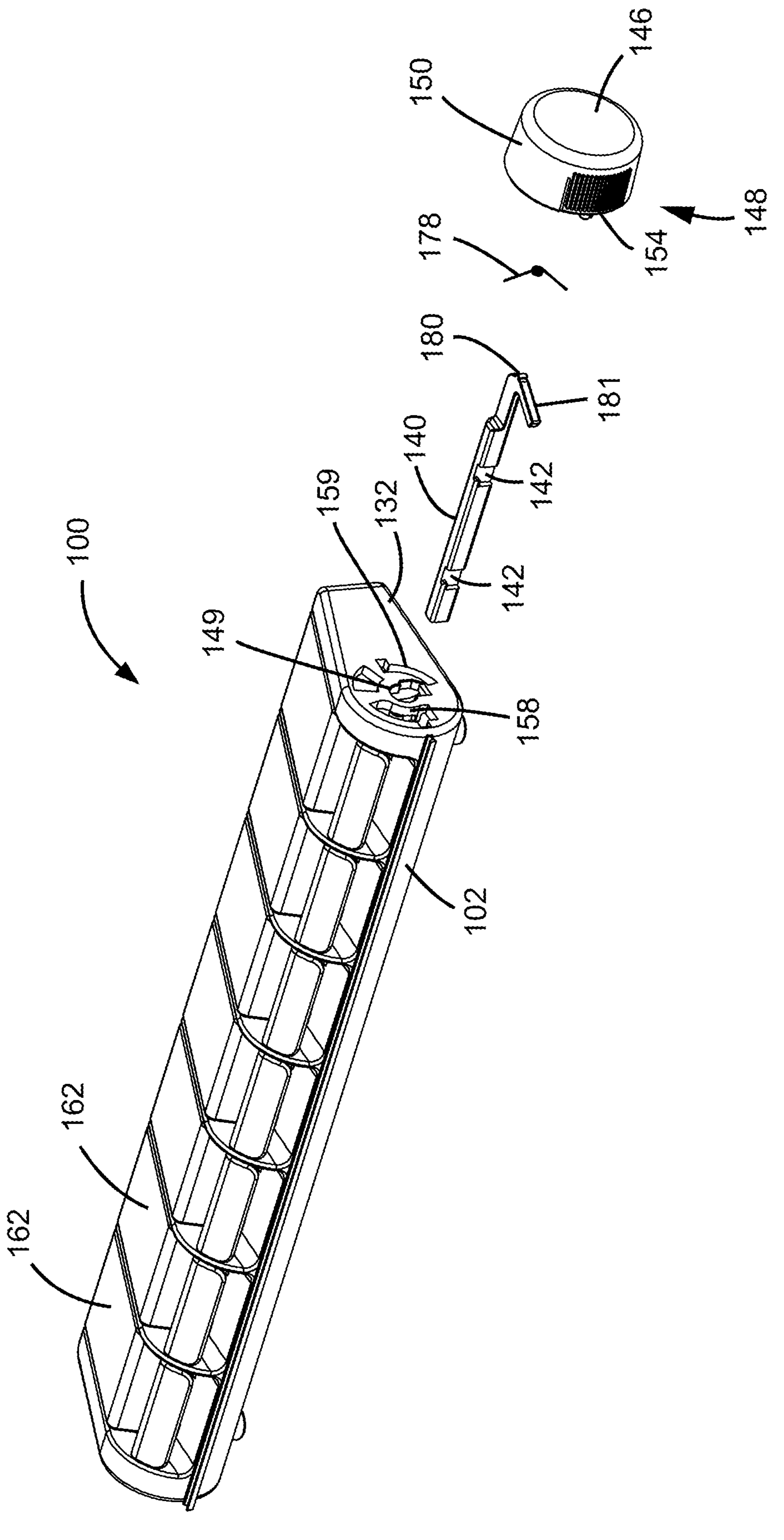
FIG. 2 is an exploded perspective view of the pill container of FIG. 1.
Figure 3:
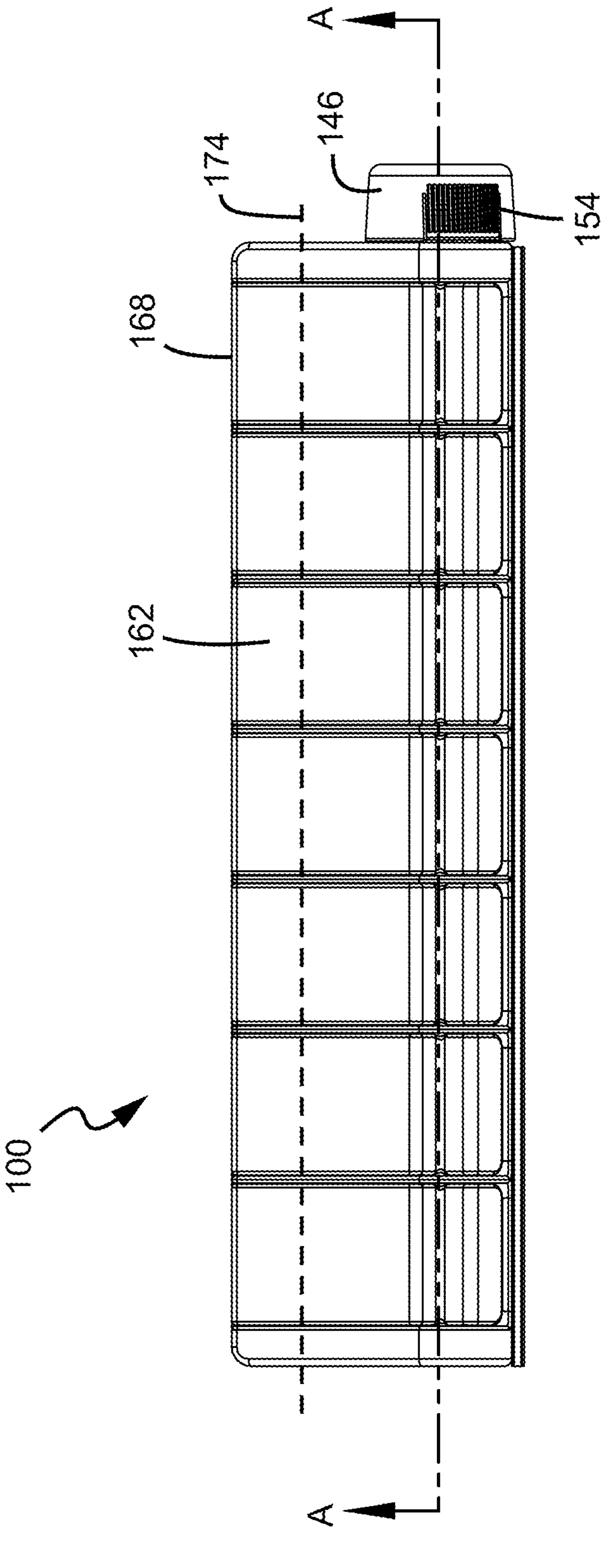
FIG. 3 is a top plan view of the pill container of FIG. 1.
Figure 4:
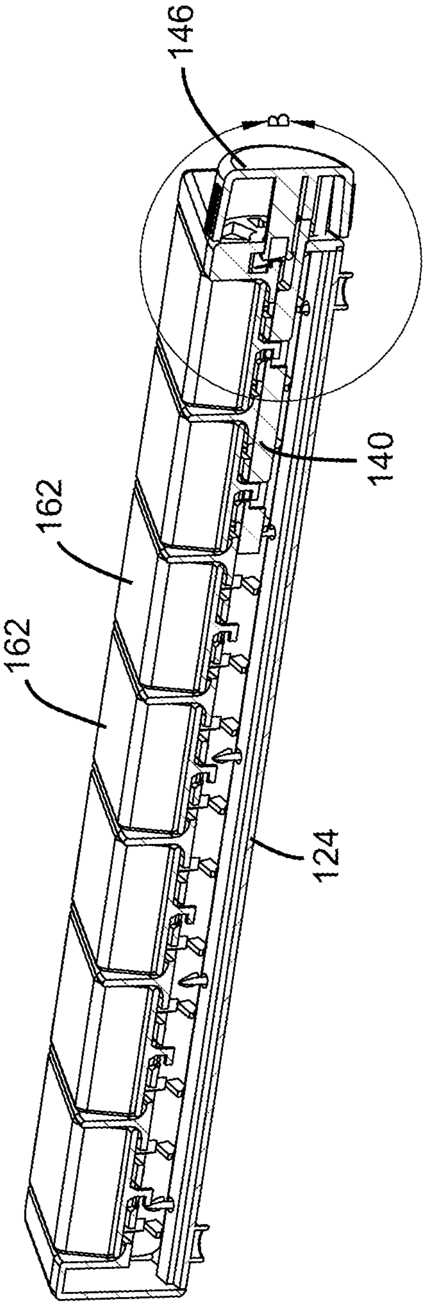
FIG. 4 is a cross-sectional view of the pill container of FIG. 1, and showing the lock bar in an unlocked position, the cross section being taken along the line A-A of FIG. 3.
Figure 5:
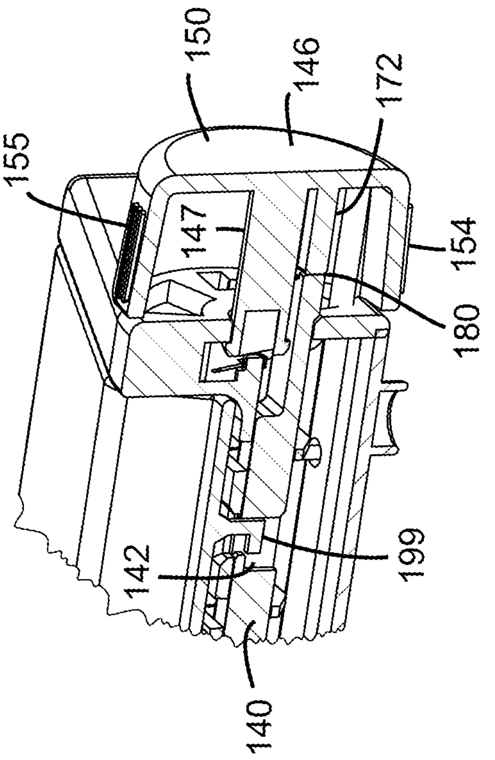
FIG. 5 is an enlarged view of a portion shown at B of FIG. 4.
Figure 6:
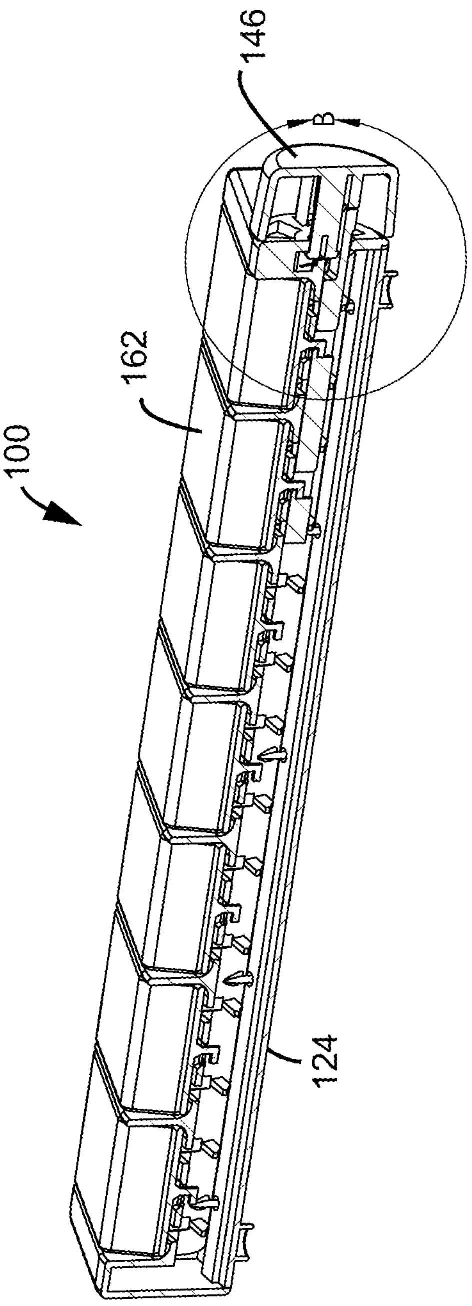
FIG. 6 is a view similar to FIG. 4, but showing the lock bar in a locked position.

In non-limiting examples, the locking mechanism comprises a lock bar 140. The lock bar 140 is slidably engaging with the second member 186 of the hook and catch arrangement 182. The lock bar 140 is movable between a locked position, which locks the lid 162 to a secure position to the base 102 and an unlocked position releasing the lid 162 from the base 102. In FIG. 2, only a partial section of the lock bar 140 is shown. In other embodiments, the full lock bar 140 is illustrated.

As can be seen in FIG. 2, the lock bar 140 has at least one notch 142. There is at least one notch 142 which corresponds to each hook and catch arrangement 182. When the lock bar 140 is in the locked position, the notch 142 is engaged with the projection 199 (FIGS. 51 and 52) of the hook and catch arrangement 182. When the lock bar 140 is in the unlocked positon (FIG. 52), the notch 142 is free of engagement with the projection 199. As such, when the lock bar 140 is moved from the locked position to the unlocked position, one or more of the lids 162 are released from being locked in the closed position and can be lifted from the closed positon to the open position.

Figure 7:
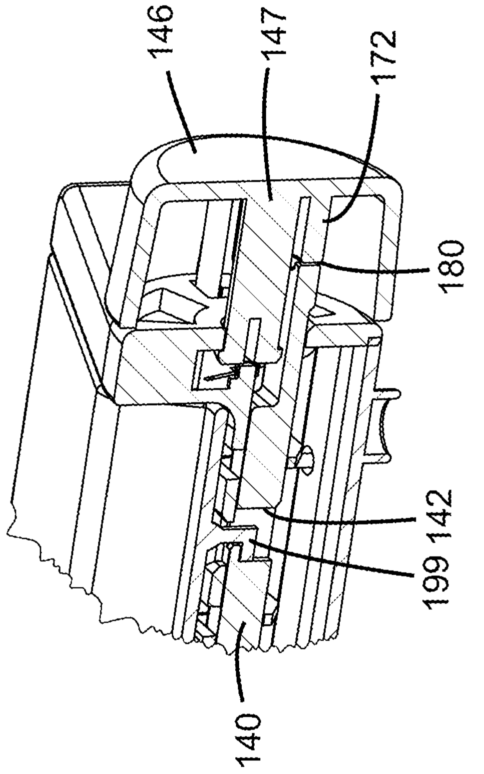
FIG. 7 is an enlarged view of the portion shown at B of FIG. 6.
Figure 8:
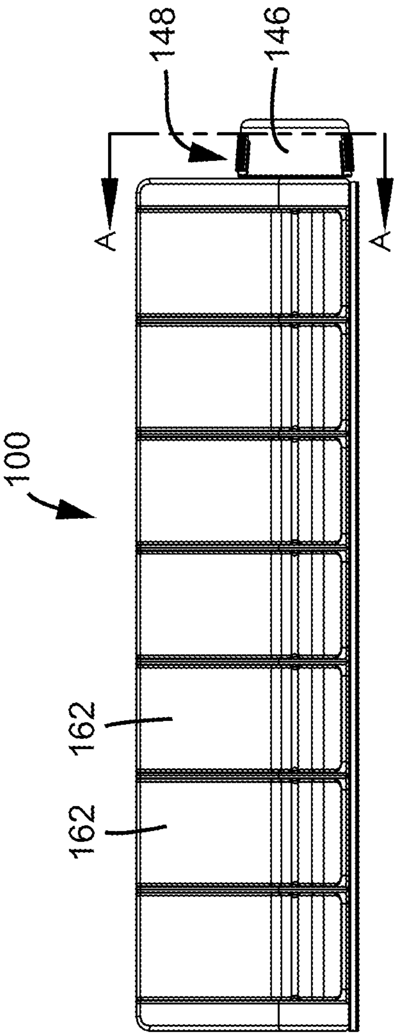
FIG. 8 is a top plan view of the pill container of FIG. 1, and showing the knob rotated from a fixed position of FIG. 3 to an unlocking position.
Figure 9:
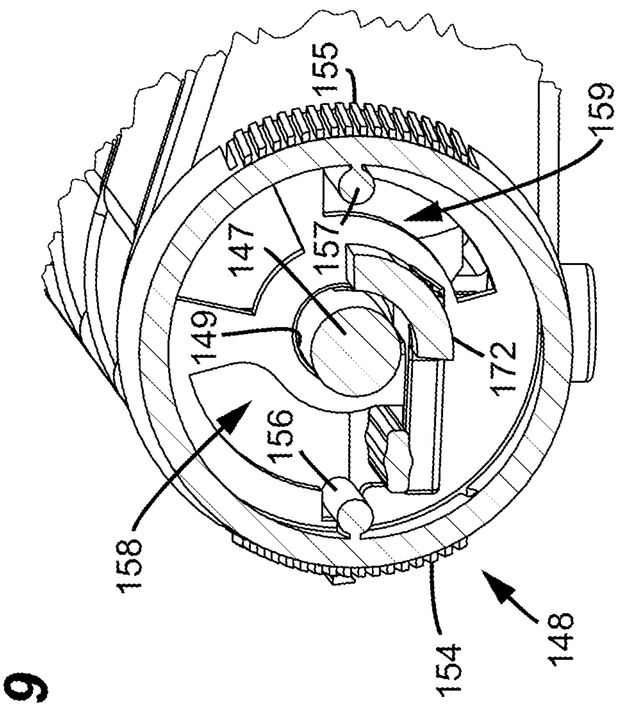
FIG. 9 is a cross-sectional view of the pill container, the cross section being taken along the line A-A of FIG. 8.
Figure 10:
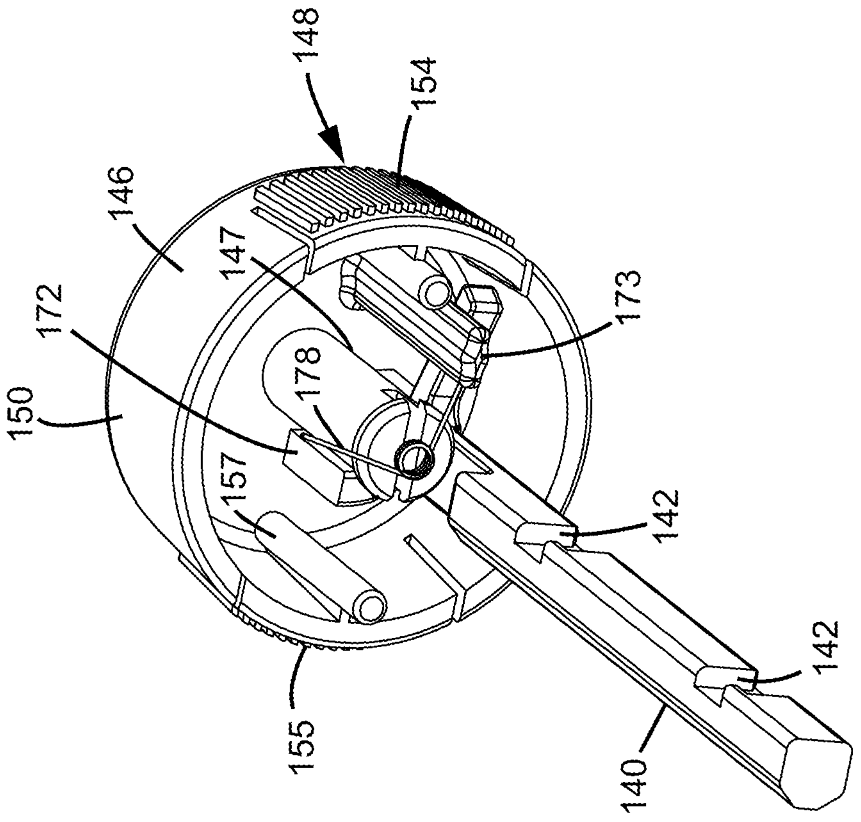
FIG. 10 is a perspective view showing engagement between the knob and the lock bar of the pill container of FIG. 1.
Figure 11:
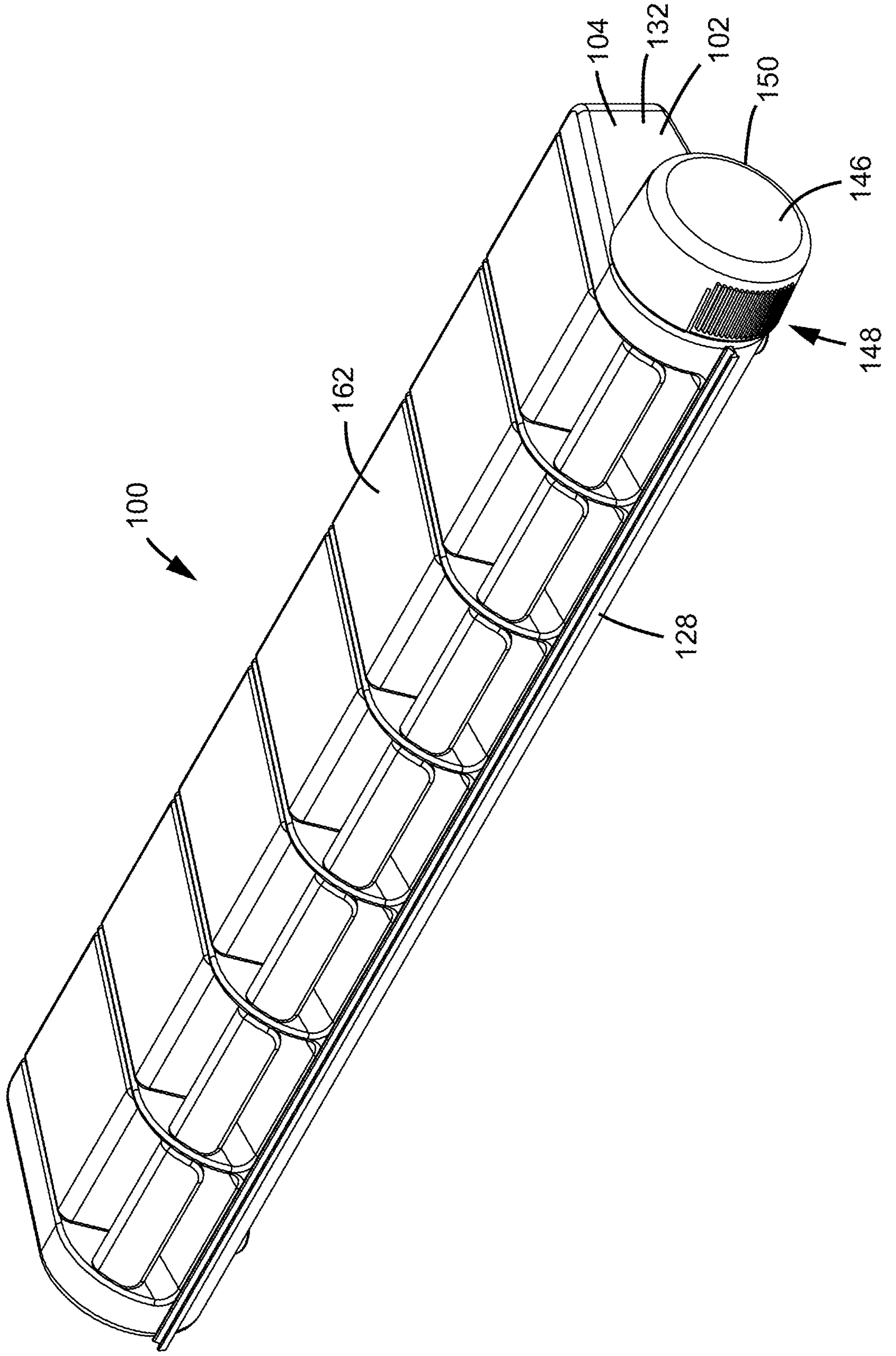
FIG. 11 is a perspective view of a second embodiment of a pill container, the pill container being shown with all the lids shown in a closed position.
Figure 12:
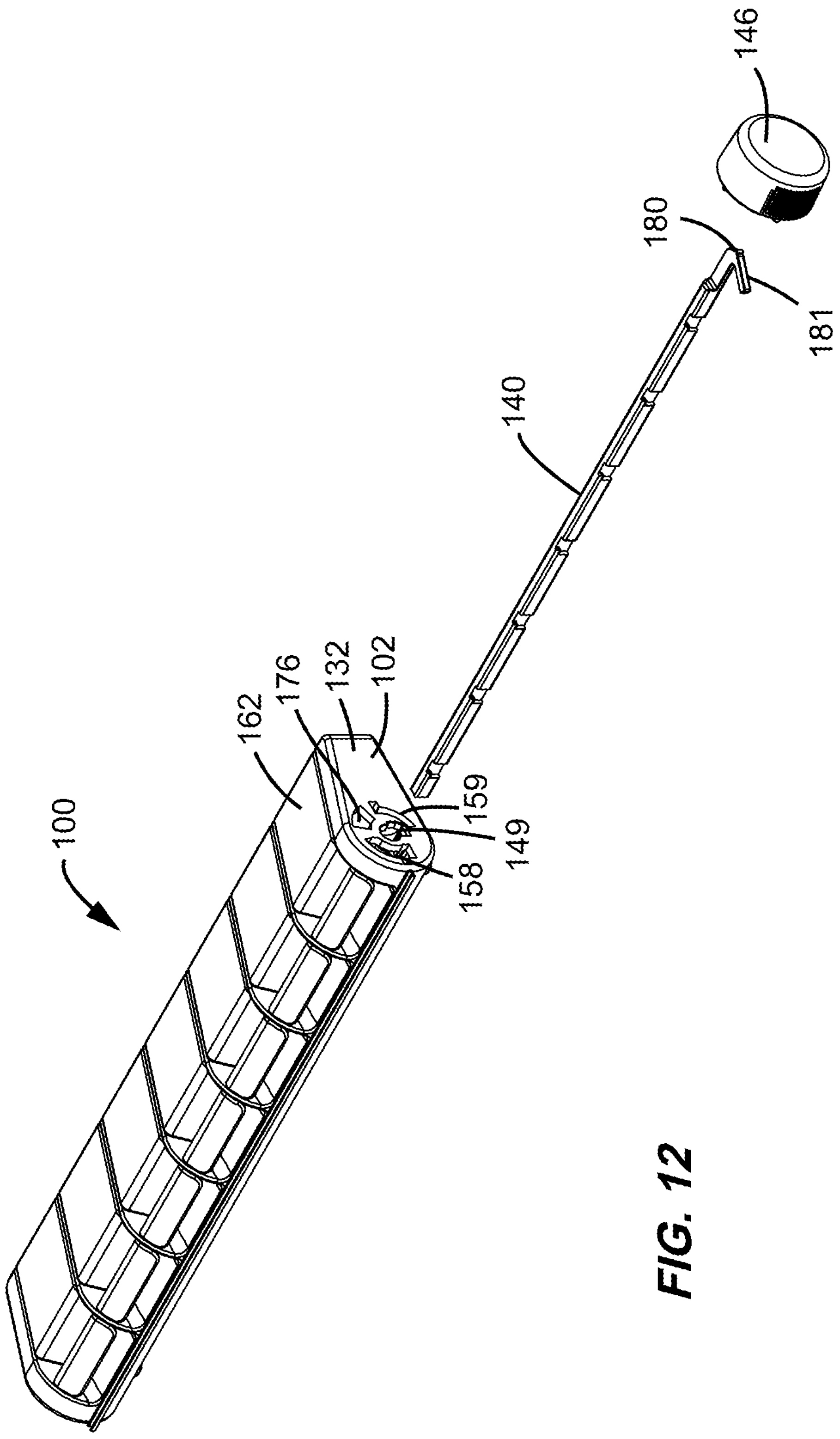
FIG. 12 is an exploded perspective view of the container of FIG. 11.
Figure 13:
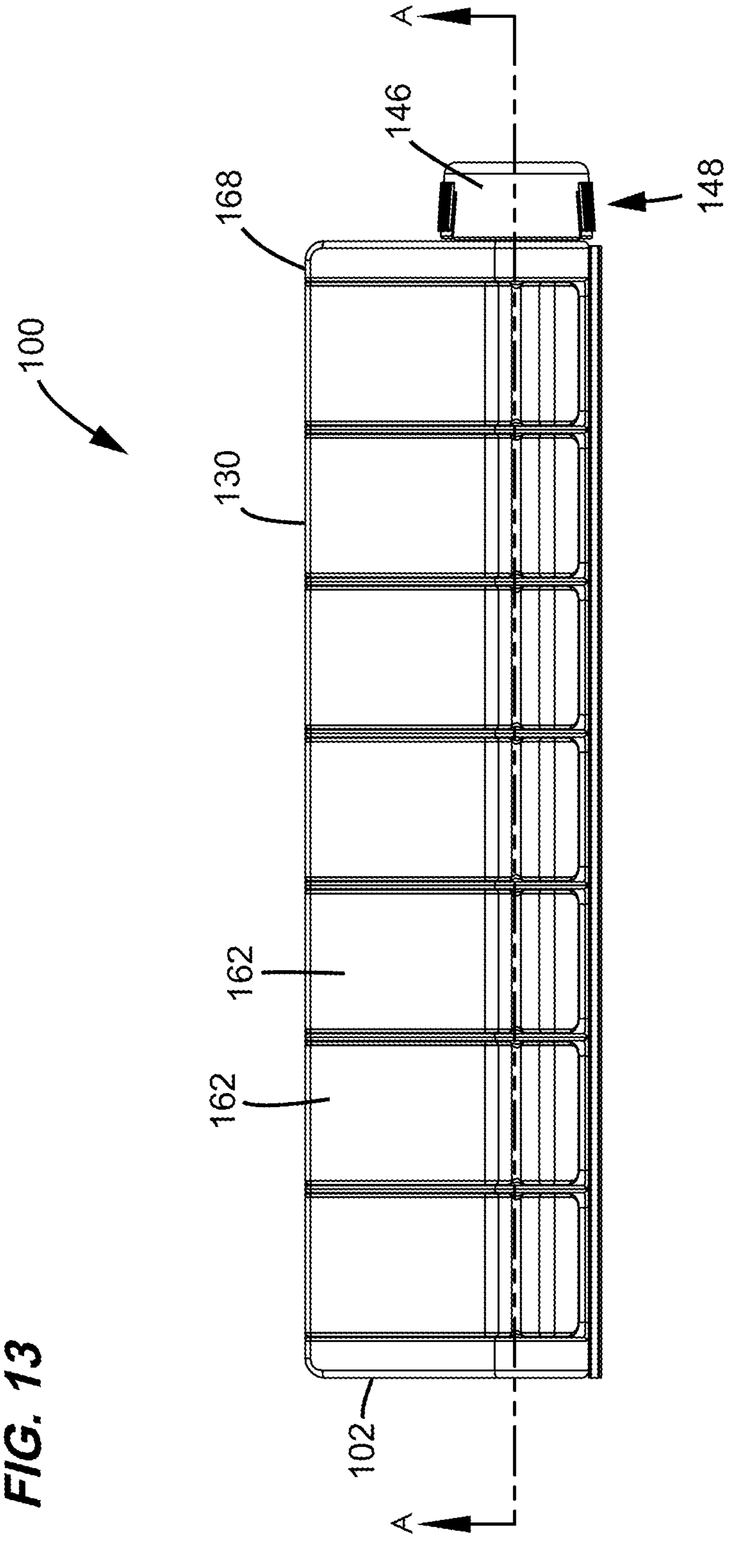
FIG. 13 is a top plan view of the container of FIG. 11.
Figure 14:
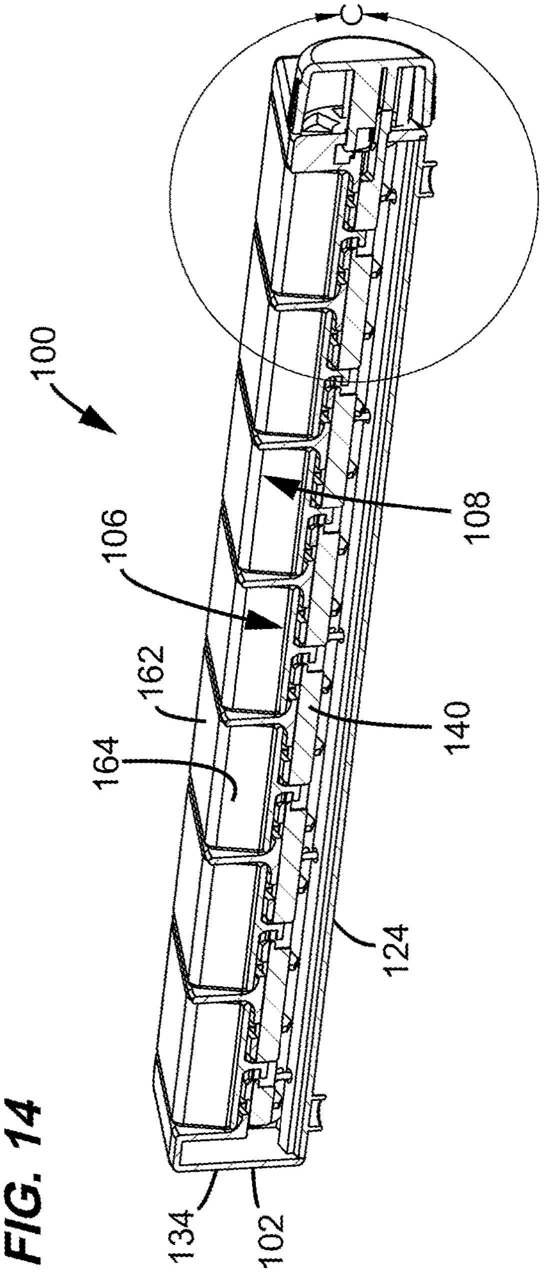
FIG. 14 is a cross-sectional view of the container of FIG. 11 showing the lock bar in an unlocked position, the cross section being taken along the line A-A of FIG. 13.
Figure 15:
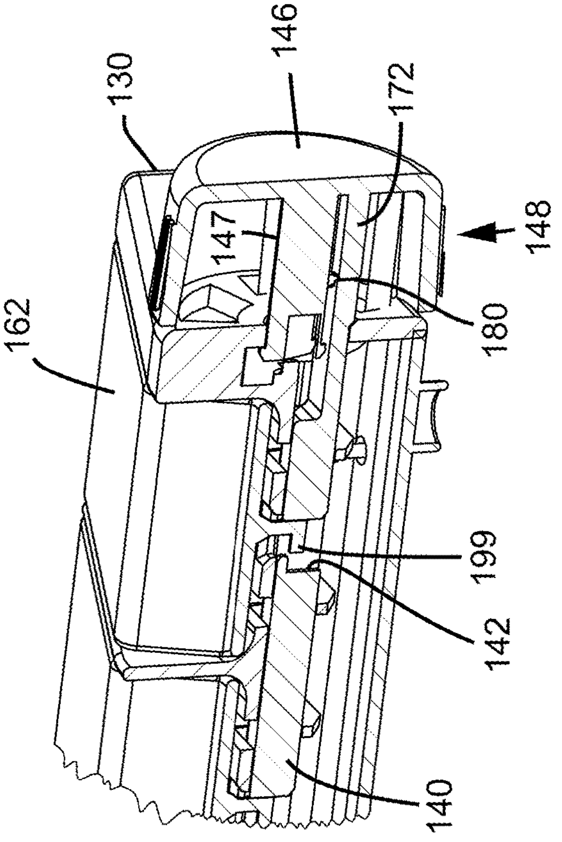
FIG. 15 is an enlarged view of section B of FIG. 14.
Figure 16:
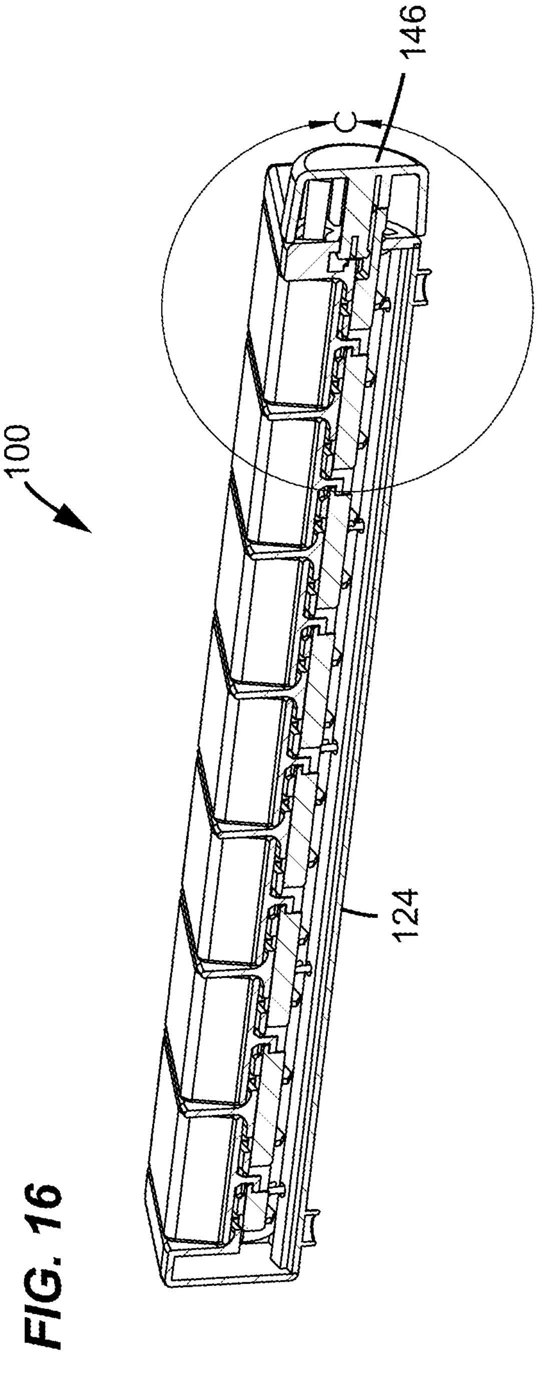
FIG. 16 is a cross-sectional view similar to that shown in FIG. 14, but showing the lock bar in a locked position.

For the embodiment of FIGS. 1-10, FIG. 5 shows the unlocked position of the lock bar 140, while FIG. 7 shows the locked position.

Figure 17:
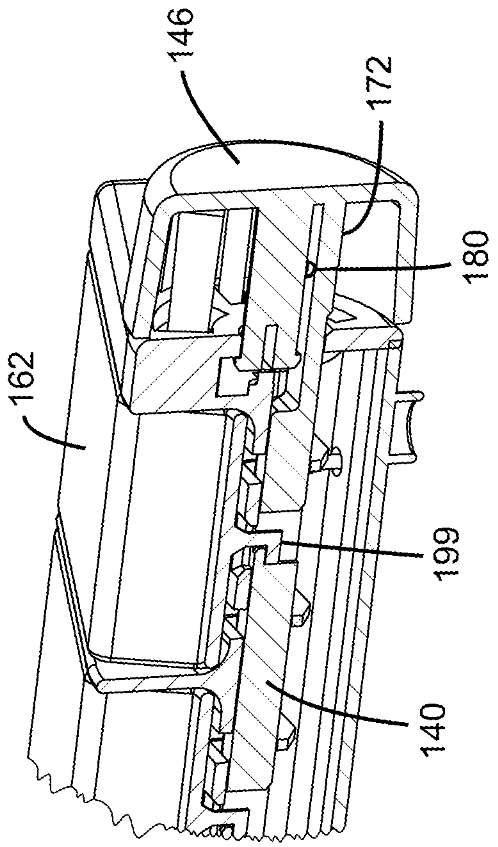
FIG. 17 is an enlarged view of section B of FIG. 16.
Figure 18:
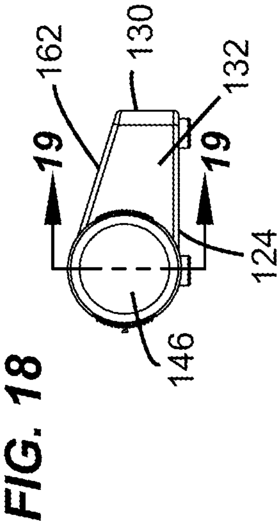
FIG. 18 is a side view of the container of FIG. 11.
Figure 19:
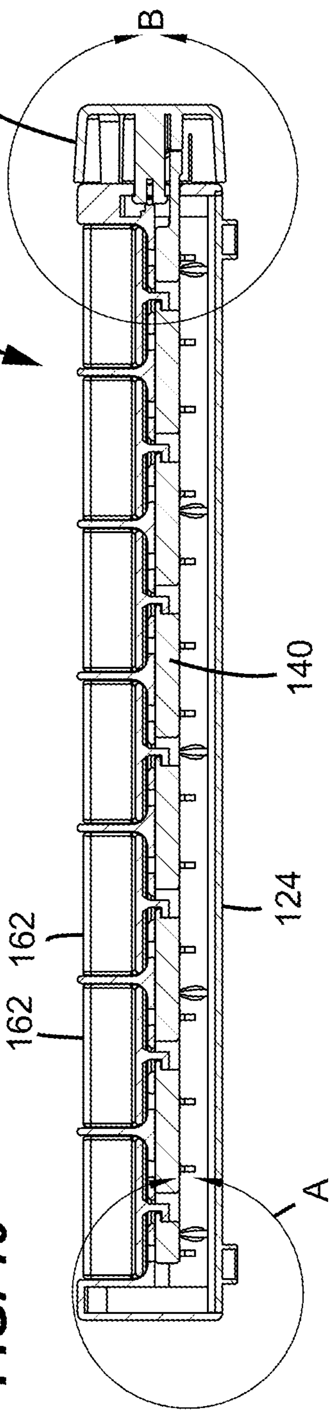
FIG. 19 is a cross-sectional view of the container, the cross section being taken along the line 19-19 of FIG. 18.
Figure 21:
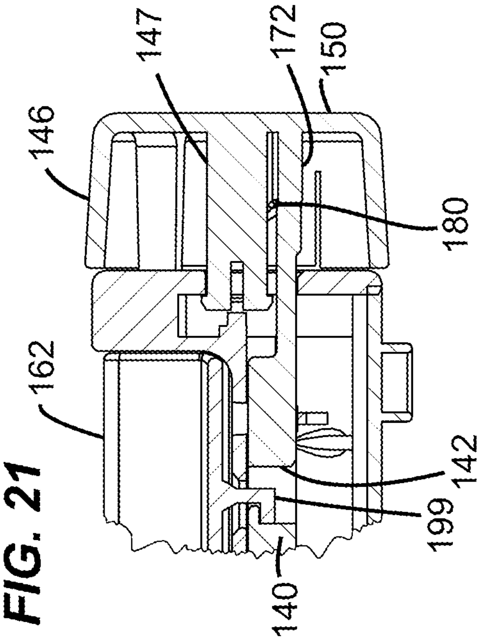
FIG. 21 is an enlarged view of portion B shown at FIG. 19.
Figure 20:
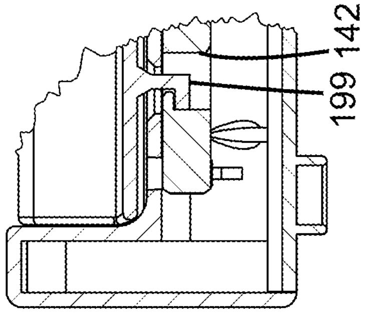
FIG. 20 is an enlarged view of the portion at section A of FIG. 19.
Figure 22:
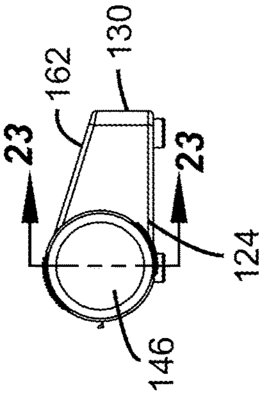
FIG. 22 is a side view of the container of FIG. 11.
Figure 23:
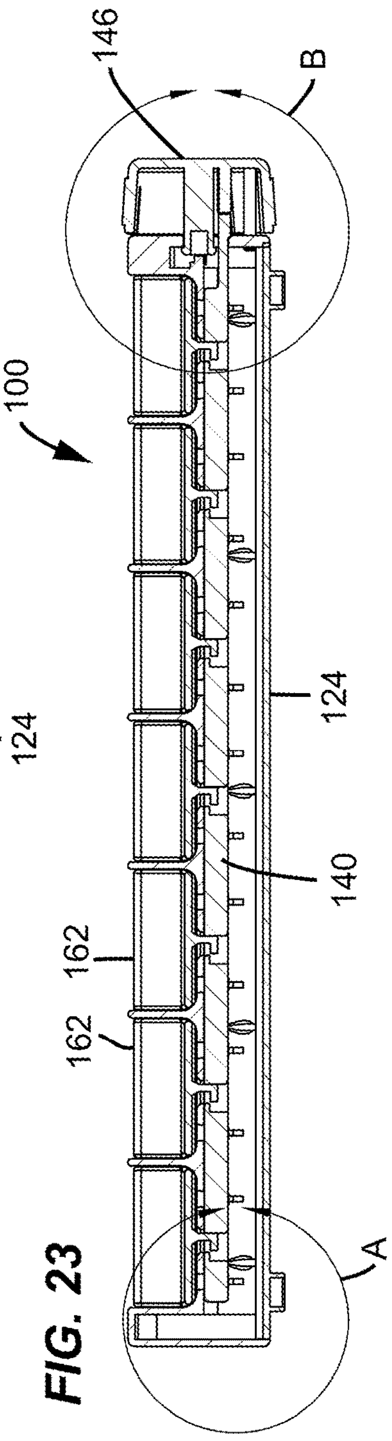
FIG. 23 is a cross-sectional view of the container of FIG. 11, the cross section being taken along the line 23-23 of FIG. 22.
Figure 25:
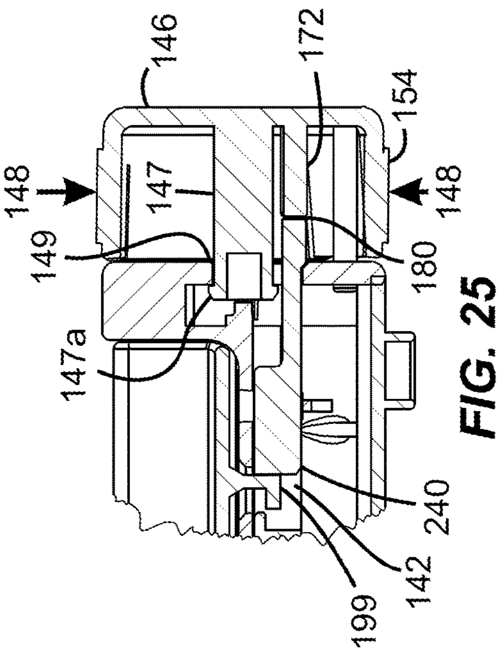
FIG. 25 is an enlarged view of section B of FIG. 23.
Figure 24:
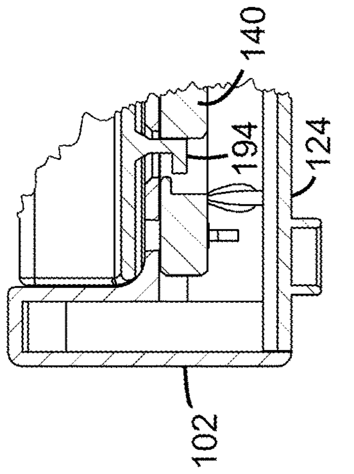
FIG. 24 is an enlarged view of section A of FIG. 23.
Figure 27:
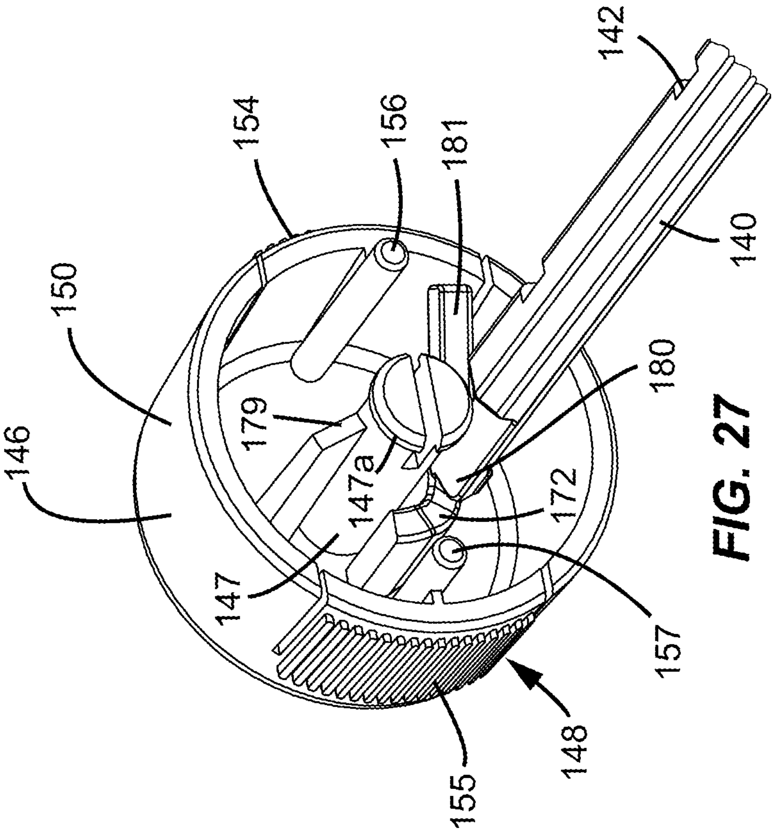
FIG. 27 is an enlarged view of section A of FIG. 26.
Figure 26:
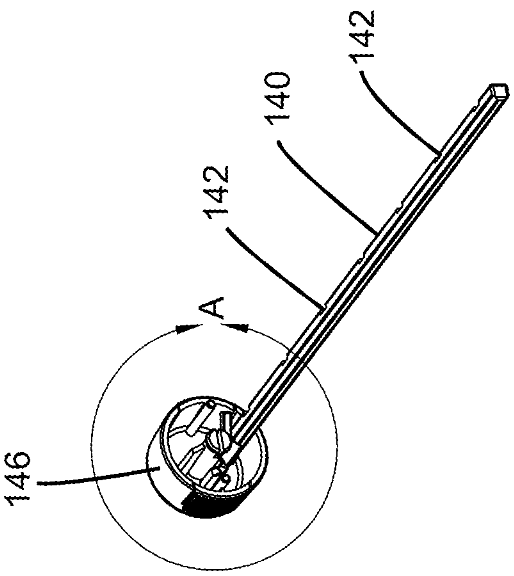
FIG. 26 is a perspective view showing engagement between the lock bar and knob used in the container of FIG. 11.
Figure 29:
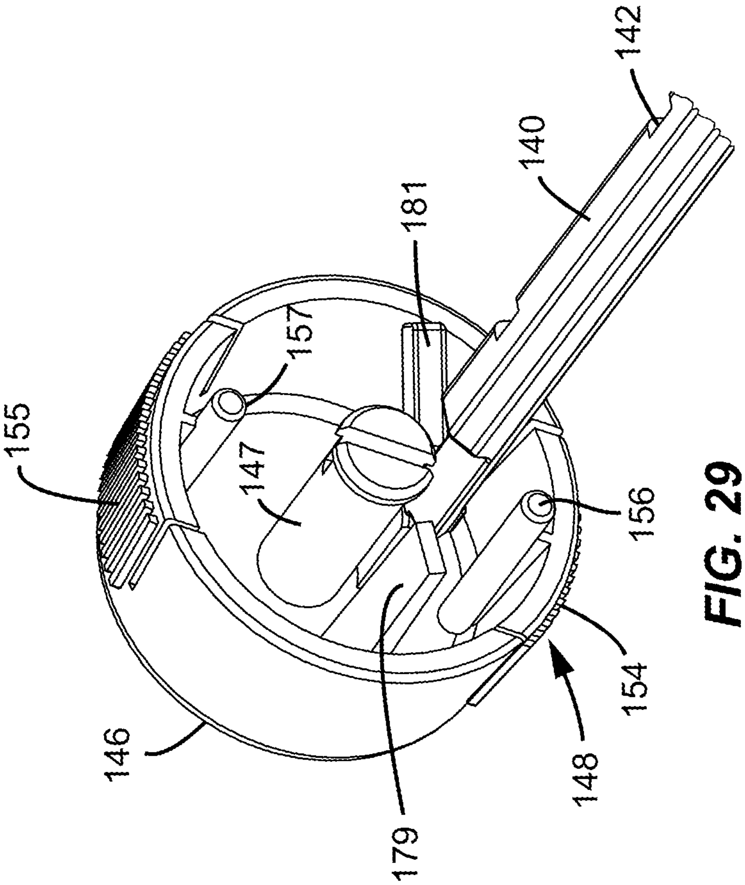
FIG. 29 is an enlarged view of section A of FIG. 28.
Figure 28:
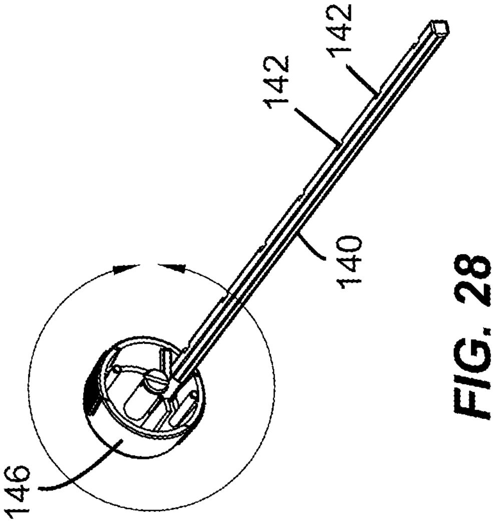
FIG. 28 is a view similar to FIG. 26, but showing the lock bar being moved to a locked position.
Figure 30:
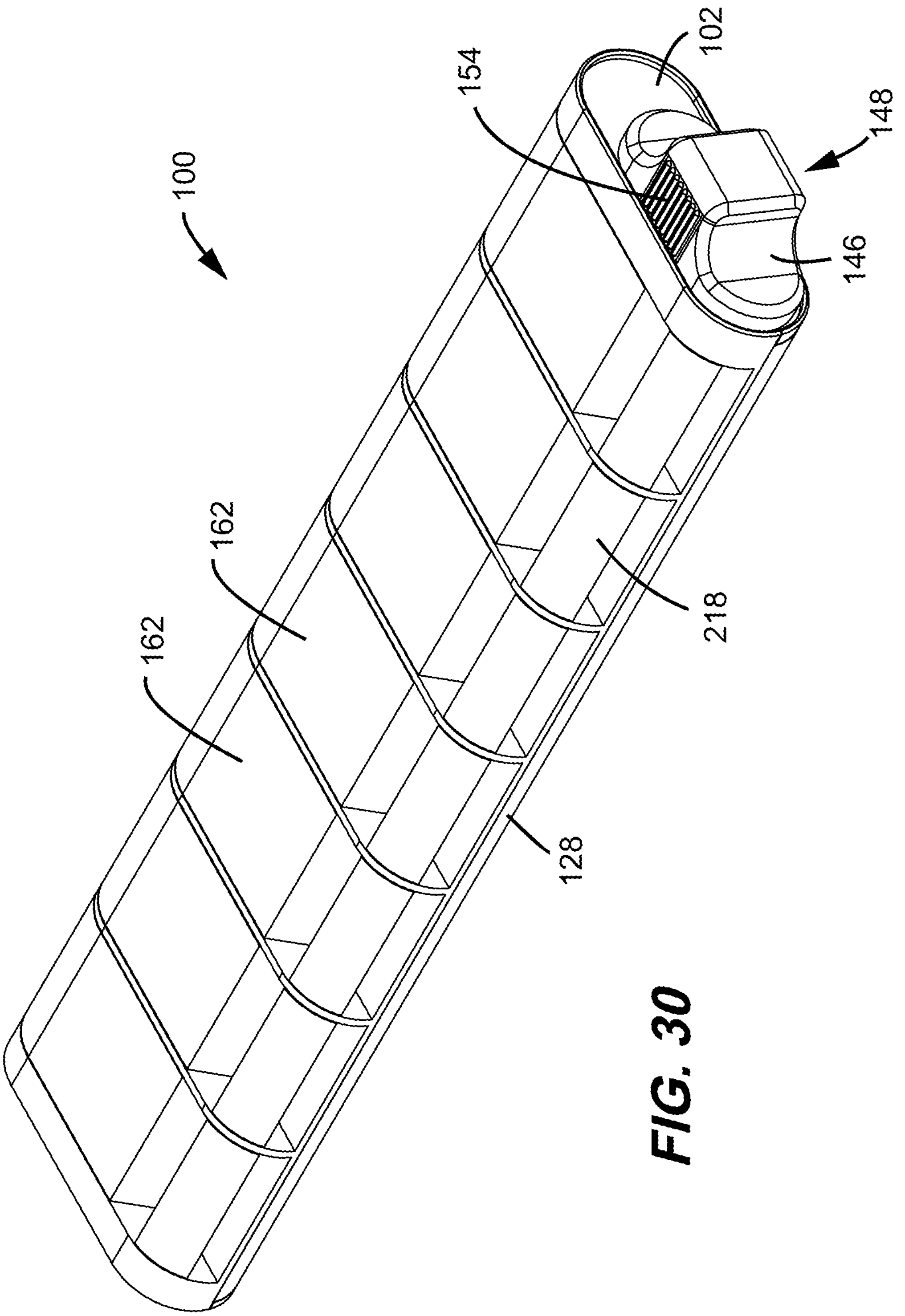
FIG. 30 is a perspective view of a third embodiment of a pill container, the lids being in a closed position.
Figure 31:
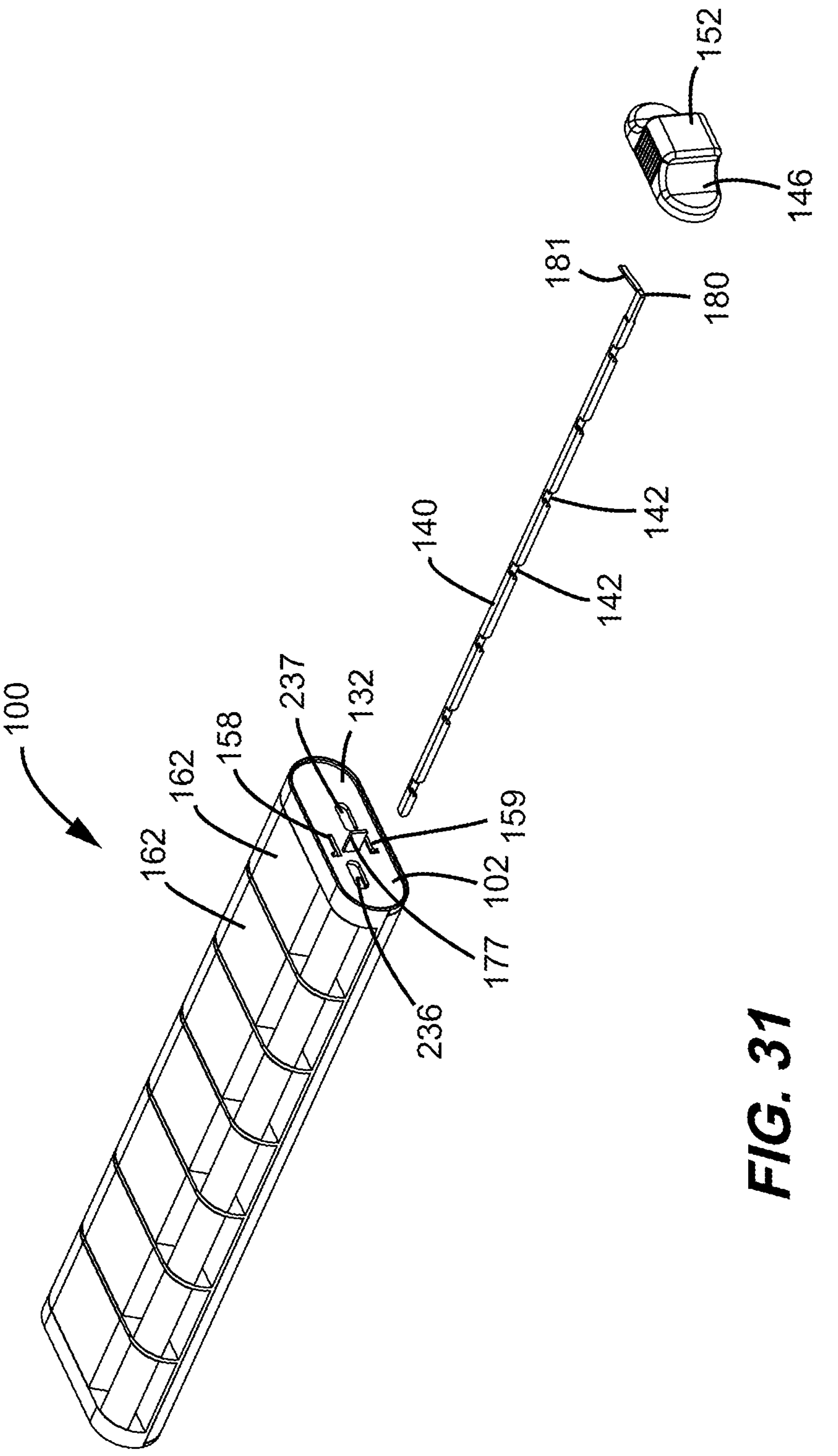
FIG. 31 is an exploded perspective view of the container of FIG. 30.
Figure 32:
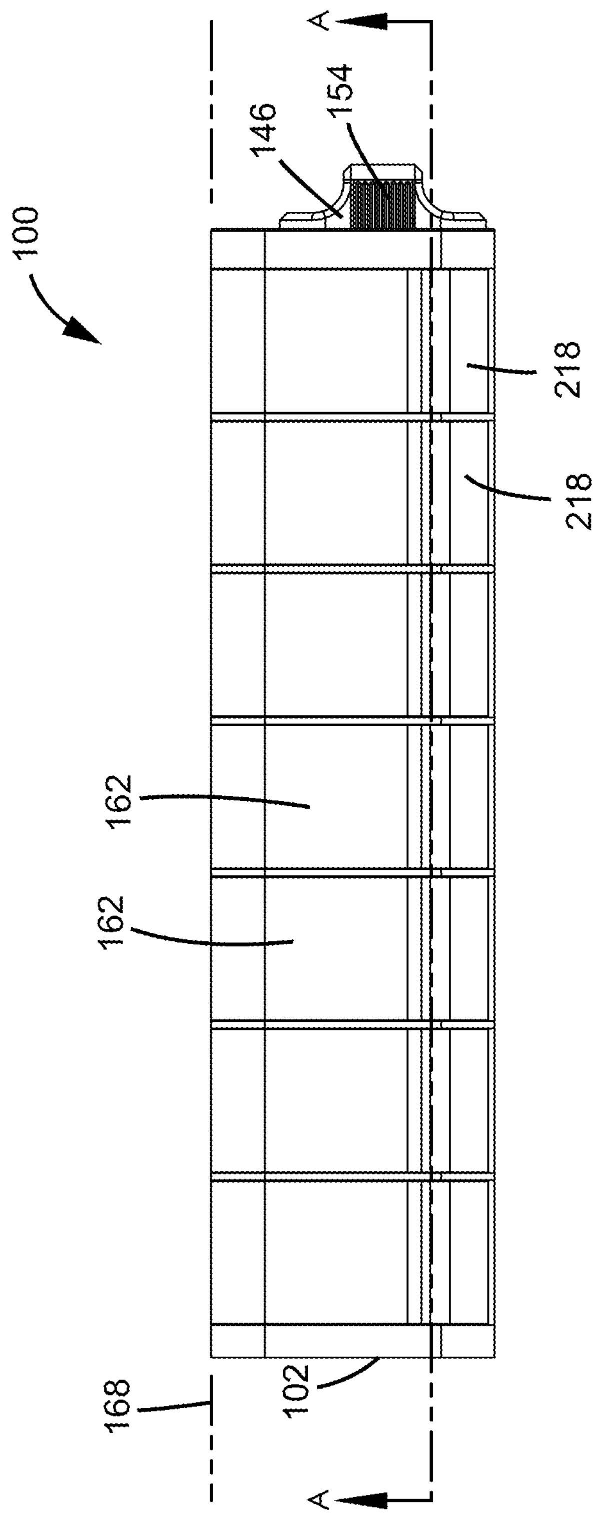
FIG. 32 is a top plan view of the container of FIG. 30.
Figure 33:
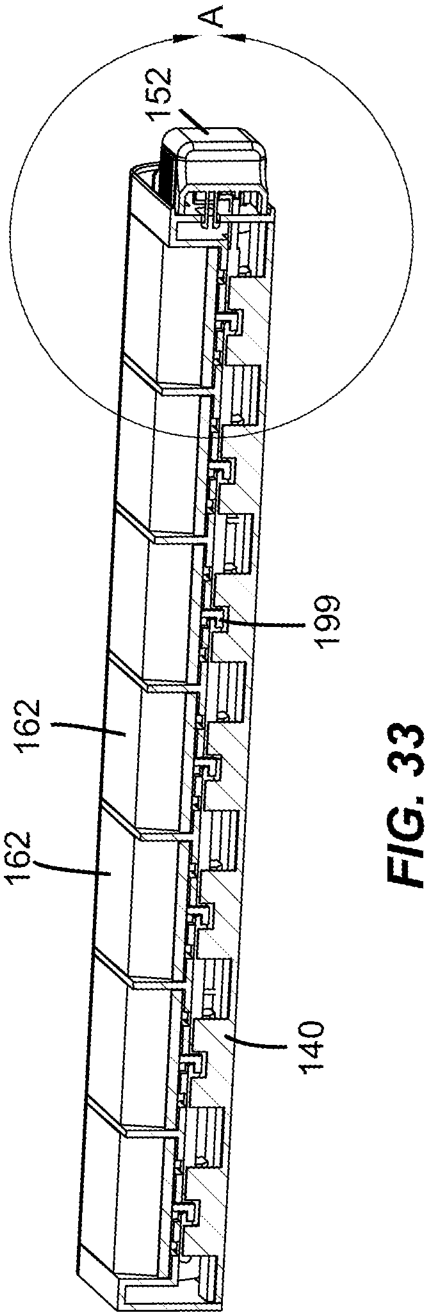
FIG. 33 is a cross-sectional view of the container of FIG. 30, the cross section being taken along the line A-A of FIG. 32, the lock bar being in an unlocked position.
Figure 34:
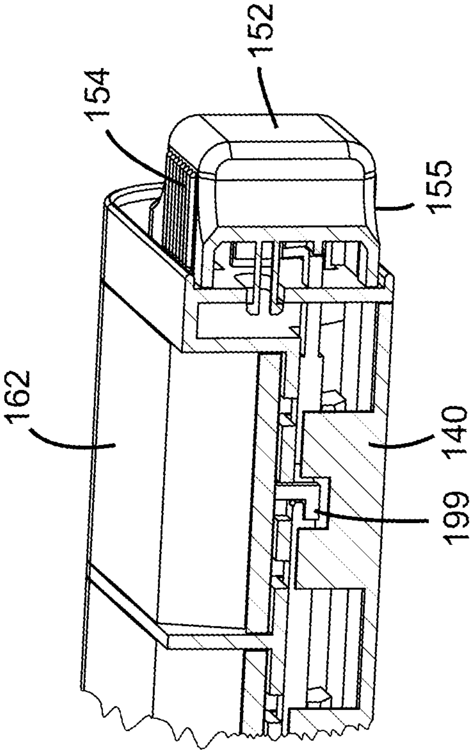
FIG. 34 is an enlarged view of section A of FIG. 33.
Figure 35:
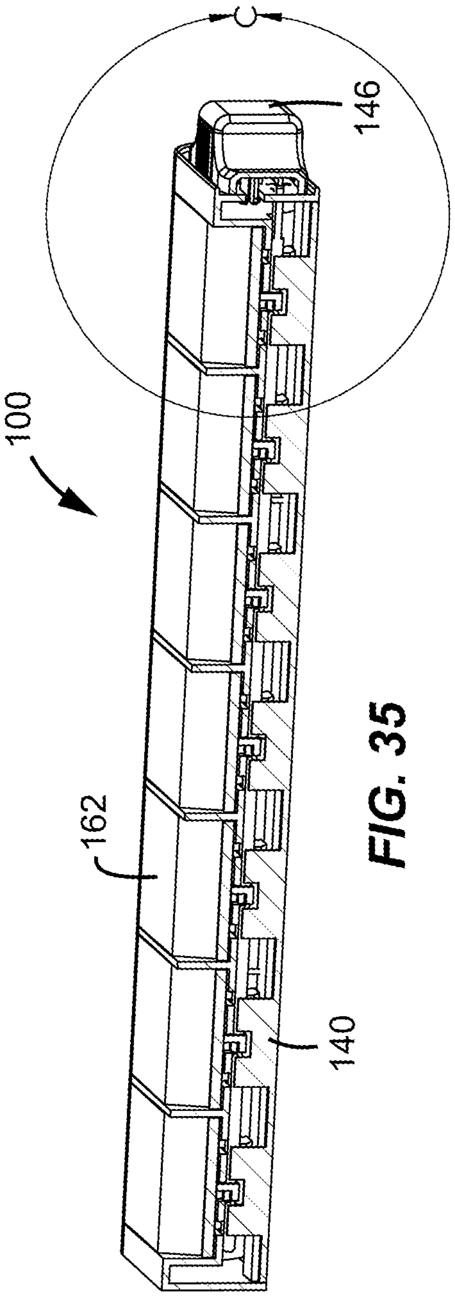
FIG. 35 is a cross-sectional view similar to the view shown in FIG. 33, but showing the lock bar in a locked position.

In the embodiment of FIGS. 11-29, FIG. 15 shows the unlocked position of the lock bar 140, while FIG. 17 shows the locked positon. In the closed position covering the cavities 106, the lids 162 are locked in FIG. 17 and unlocked in FIG. 15.

Figure 36:
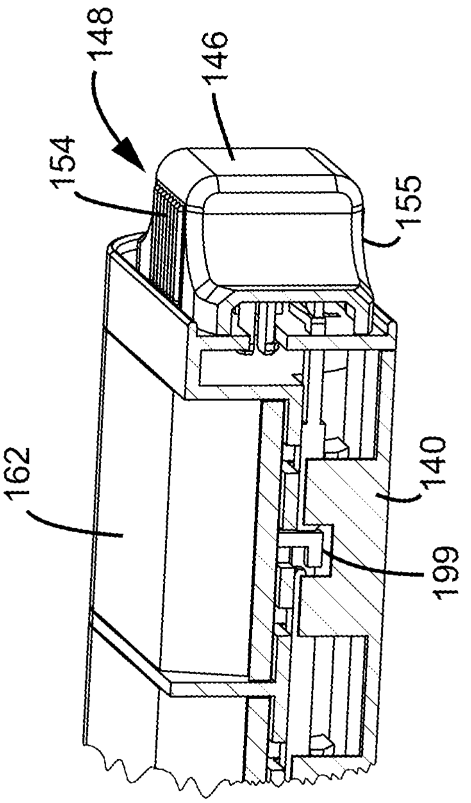
FIG. 36 is an enlarged view of section A of FIG. 35.
Figure 37:
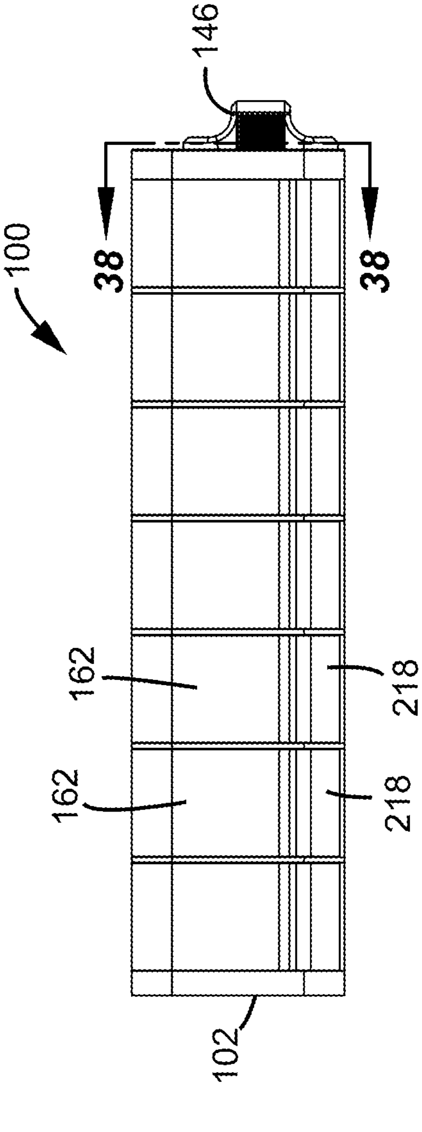
FIG. 37 is a top plan view of the container of FIG. 30.

In the embodiment of FIGS. 30-40, FIG. 34 shows the locked position of the lock bar 140, while FIG. 36 shows the unlocked position.

Figure 48:
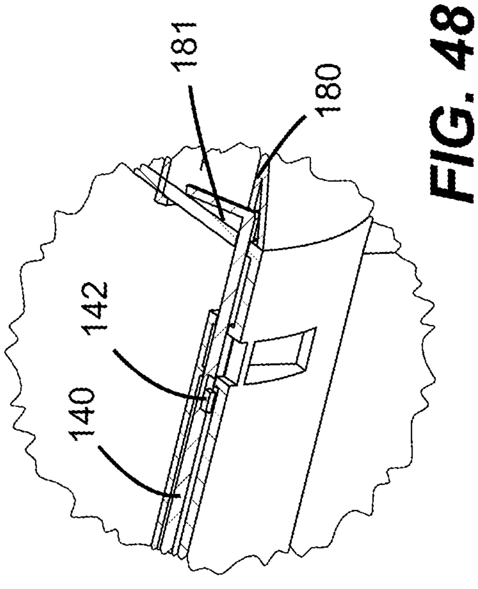
FIG. 48 is an enlarged view of section A of FIG. 47.
Figure 49:
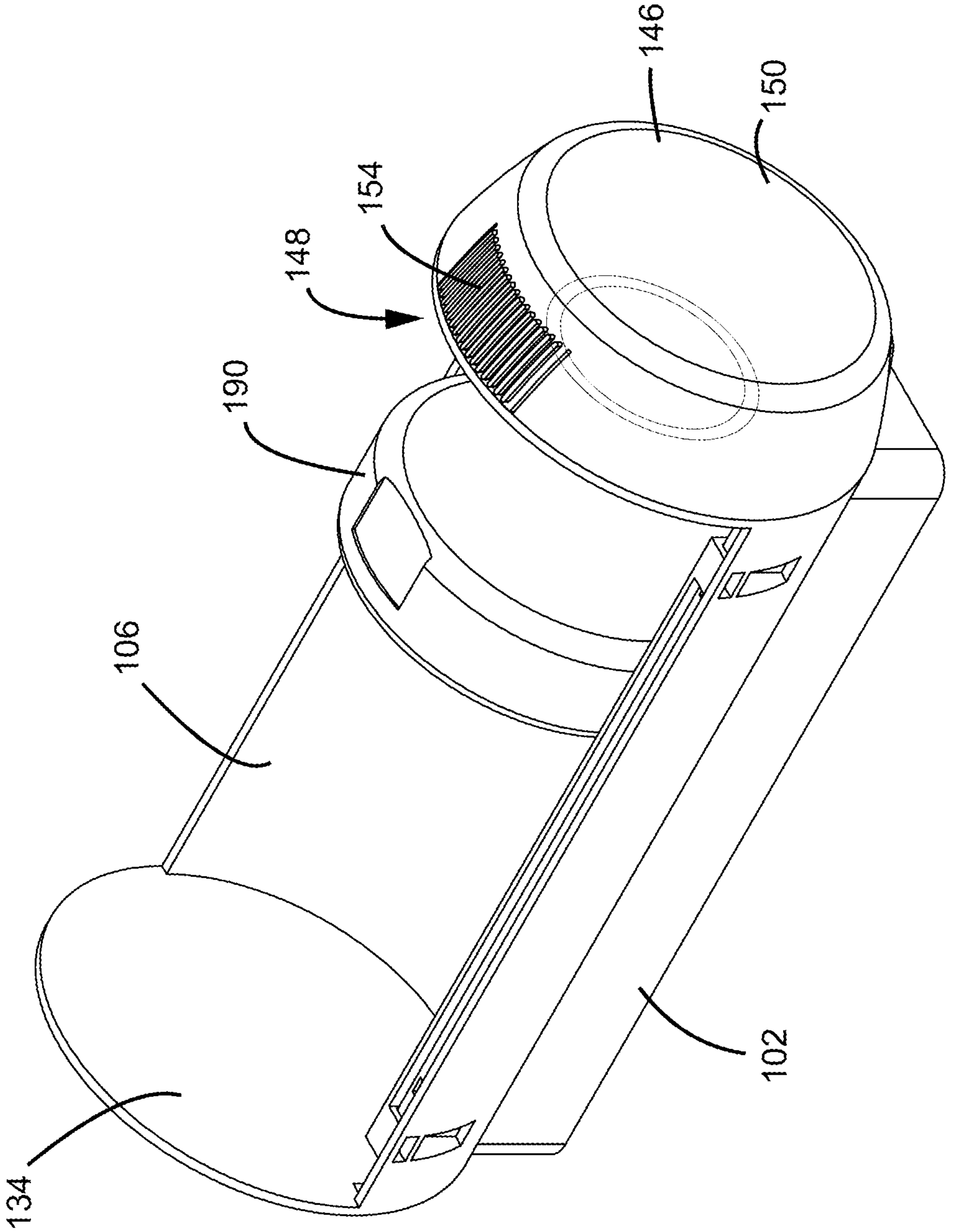
FIG. 49 is a perspective view showing the container of FIG. 41, with the lid removed and showing a separate container stored therein.
Figure 50:
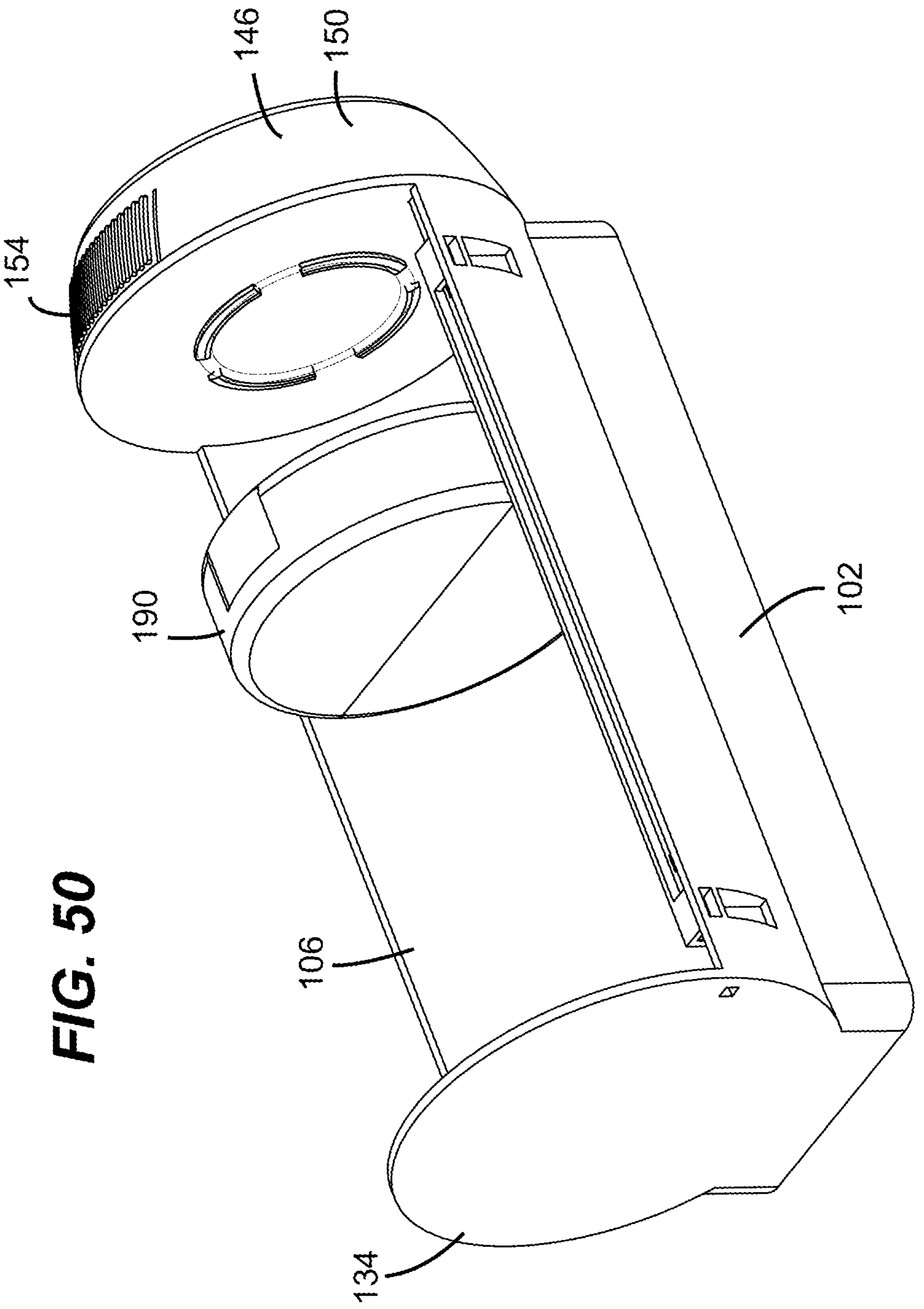
FIG. 50 is another perspective view of FIG. 49.

In the embodiment of FIGS. 41-50, FIG. 46 shows the locked position of the lock bar 140, while FIG. 48 shows the unlocked position. The lid 162 is shown removed from the base 102, but if it were in place in the closed position, FIG. 46 would show the lid 162 locked in place, while FIG. 48 would show the lid 162 unlocked.

Figure 62:
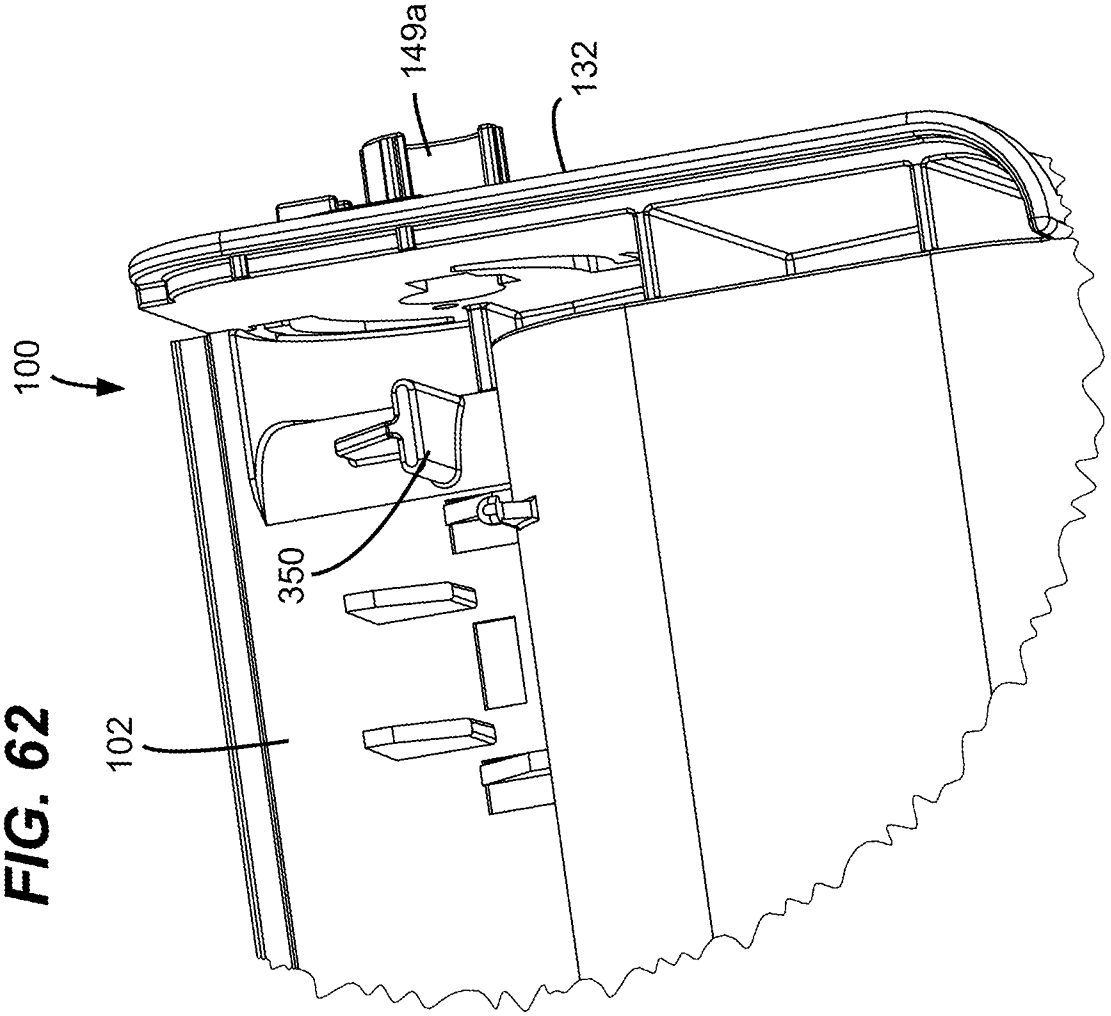
FIG. 62 is a perspective view of an enlarged portion of bottom, end of the pill container of FIG. 60.

FIG. 62 shows a bottom view of a portion of the container 100. In this embodiment, a rib 350 projects from the base 102 and acts as a guide to align the lock bar 140.

In each of these embodiments, the lock bar 140 has an end heal 180 with an extending flange 181. The flange 181 will press against the side wall 132 of the base 102 and acts as a cantilevered spring that forces the lock bar 140 from the unlocked position back to the locked position. As explained further below, a portion of the lock bar 140 engages against other structure to move the lock bar from the locked position to the unlocked position. In the examples explained below, the end heal 180 of the lock bar slidingly engages against a ramp 172 within a knob 146, when the knob 146 is moved from its fixed position to a released position.

Example Secondary Latch Arrangement

Figure 52:
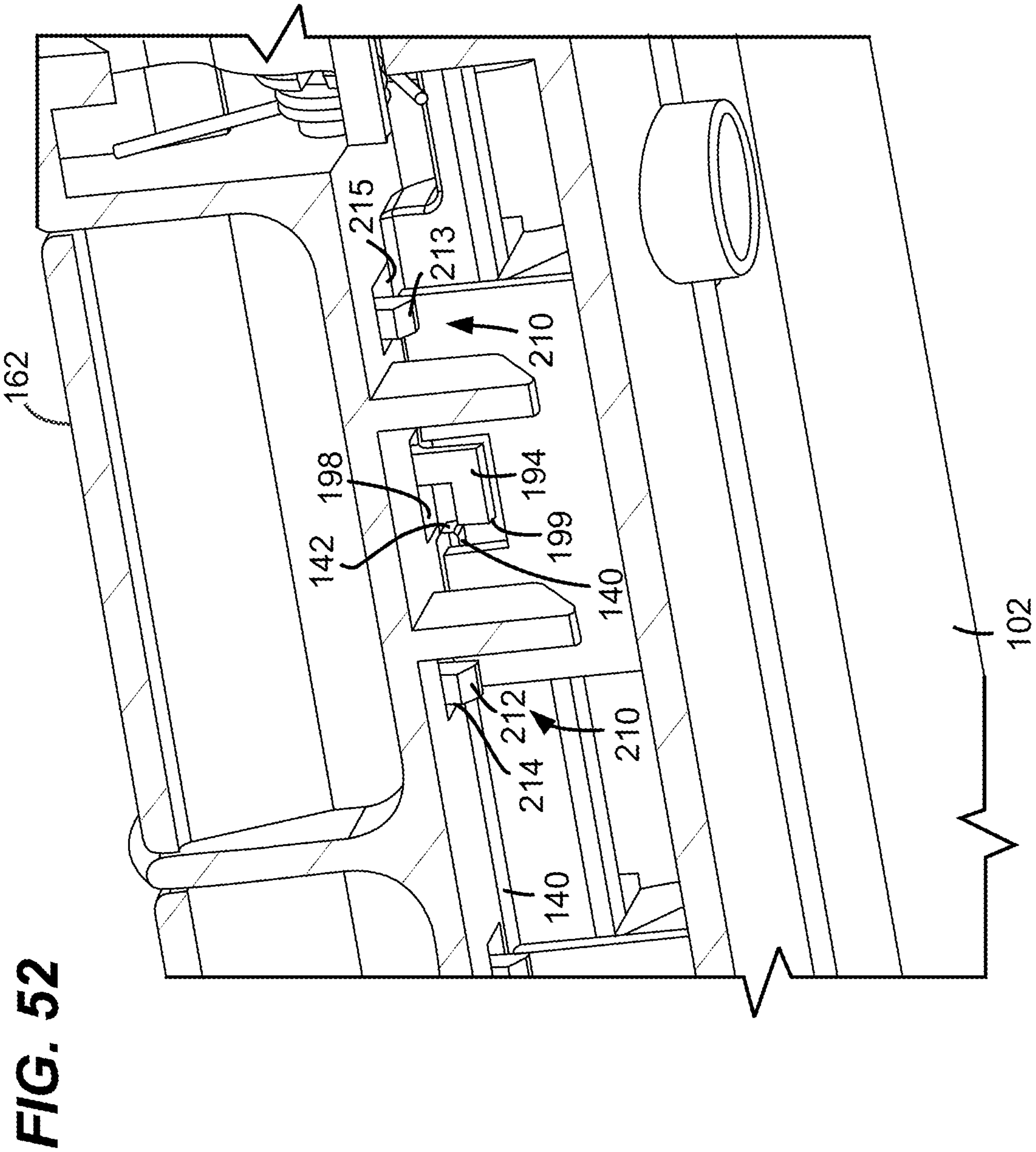
FIG. 52 is an enlarged view showing a cross-section, representative of the containers of FIGS. 1-50, with a lid in the closed position with a secondary latch arrangement engaged, and a lock bar in an unlocked position.

In reference again to FIG. 51 and now to FIG. 52, each of the containers 100 includes a secondary latch arrangement 210 (FIG. 52). The secondary latch arrangement 210 functions to secure each lid 162 in the closed position covering the sub-cavities 110, such that the lids 162 remain closed after the lock bar 140 is moved to the unlocked position. While many different embodiments are possible, in the example shown, the secondary latch arrangement 210 includes a pair of latch hooks 212, 213 and a mating pair of latch catches 214, 215. The latch hooks 212, 213 engage or hook into the latch catches 214, 215. The latch hooks 212, 213 can be released from engagement with the latch catches 214, 215 by applying a small pulling force to separate them. In this embodiment, the latch hooks 212, 213 project from the free end 196 of the lids 162, while the latch catches 214, 215 are in the base 102, adjacent the front wall 128. In the example shown, the catch 198 of the hook and catch arrangement 182 is located between the latch catches 214, 215. In FIG. 52, the lock bar 140 is shown in the unlocked position, freeing engagement with the projection 199.

One of the advantages of the secondary latch arrangement 210 is that when the lock bar 140 moves to the unlocked position, all of the lids 162 do not automatically open. Rather, an additional step taken by the user is needed to lift the selected lid 162 to release engagement of the secondary latch arrangement 210. This contributes to the child-resistant nature of the container 100.

Still in reference to FIG. 51, in the embodiment shown, each of the lids 162 includes a finger tab 218. The finger tab 218 is shaped for convenient engagement or manipulation by a human finger to lift the lid 162 to disengage the secondary latch arrangement 210 and pivot the lid 162 about the hinge joint 168.

Example Actuator

The container 100 includes an actuator to move the locking mechanism from the locked position to unlocked position.

In non-limiting examples, the actuator comprises a knob 146. The knob 146 has a squeeze actuator 148 that releases the knob 146 from a fixed position to a position which allows the knob 146 to move and push on the lock bar 140, which urges the lock bar 140 from the locked position to the unlocked position.

In the embodiment of FIGS. 1-10, FIGS. 11-29, FIGS. 41-50, and 54-62, the knob 146 moves rotationally and is in the form of a turn dial 150.

In the embodiment of FIGS. 30-40, the knob 146 is in the form of a slide tab 152 and it slides linearly along one of the side walls 132, 134 of the container 100.

In general, the squeeze actuator 148 includes a pair of opposite outwardly facing grip or knurled surfaces 154, 155. The squeeze actuator 148 also includes a pair of inwardly extending ribs 156, 157 (not shown in the FIG. 41-50 embodiment, but it should be understood that the knob 146 in the FIG. 41-50 embodiment is analogous to the FIGS. 1-29 embodiments). When the grip or knurled surfaces 154, 155 are squeezed in a direction toward each other, the ribs 156, 157 are moved inwardly, toward each other and moved into open channels 158, 159 (FIGS. 2, 9, 12, 31, 38, 61) formed in the sidewall 132 of the base 102, which allows the knob 146 to move from its fixed position. In the embodiments that include the knob 148 as the dial 150, it allows the knob 146 to rotate. In the embodiment of FIGS. 30-40, when the knob 46 is in the form of slide tab 152, the knob 146 can move from its fixed position to move linearly along the side of the container 100.

The knob 146 includes an internal ramp 172 (FIGS. 9, 10, 21, 25, 27, 40, 44, 59) projecting axially from an internal surface of the knob 146. As the knob 146 is moved from its fixed positon, the lock bar 140 (for example, the end heal 180 of the lock bar 140) engages against the ramp 172, which results in the lock bar 140 sliding in a direction parallel to the longitudinal axis 174 (FIG. 3) of the base 102 to the unlocked position. When the lock bar 140 is moved to the unlocked position, the flange 181 is moved and flexed against the sidewall 132 and held in compression until the knob 146 is released, in which case the flange 181 returns to its uncompressed position, and slides the lock bar 140 back into the locked position. The flange 181 can be guided within guide posts 181*a*, 181*b* (FIG. 58) projecting from the side wall 132, as the end heal 180 moves against the ramp 172.

In the embodiments of FIGS. 1-29, the knob 146 includes an internally projecting central post 147, which is received within an aperture 149 in the sidewall 132 of the base 102, to hold the knob 146 in place against the base 102. The post 147 can include an end flange 147*a* (FIGS. 25 and 27) to secure the knob 146 in place. In FIGS. 57-61, there can be a projecting receiving post 149*a*, extending from the sidewall 132 to receive the post 147. In FIG. 59, the post 147 can be in the form of a split post 147.

In the embodiment of FIG. 30-40, the knob 146 includes two internally projecting post pairs 231, 232 (FIG. 40), which are received within apertures 236, 237 (FIGS. 31 and 38) in the sidewall 132. The post pairs 231, 232 can also have end flanges 231*a*, 232*a* to secure the post pairs 231, 232 in place against the base 102.

Each of these embodiments includes a mechanism that automatically returns the knob 146 to the fixed position, when the squeeze actuator 148 is released. In the embodiment of FIGS. 1-10, a spring in the form of a torsion spring 178 (FIGS. 2, 10, and 58) introduces a bias to push against the rotation of the knob 146. The knob 146 of FIGS. 1-10 includes a spring stop 173, extending from an internal surface of the knob 146 and forming a backstop for the spring 178. The knob 146 of FIG. 59 includes a spring-retaining aperture 308 constructed and arranged to receive a portion (e.g., a free end 310, FIG. 58) of the torsion spring 178 and retain the torsion spring 178 in place. A hole 312 (FIG. 58) in the sidewall 132 also engages the spring 178. In particular, hole 312 is positioned to preload the spring 178 to assist with “auto-locking”, i.e., ensuring that the knob 146 returns to the fixed position, which moves the lock bar 140 from its unlocked position to a locked position.

As mentioned above, the spring 178 ensures that the knob 146 returns to the fixed position, which moves the lock bar 140 from its unlocked position to a locked position. When it is desired to move one of the lids 162 from the open position to a closed position, the knob 146 must be moved against the bias of the spring 178 from its fixed position to the released, or unlocking, position which allows the knob 146 to move and push on the lock bar 140. The lock bar is then moved to the unlocked position, and the lid 162 can be closed in a covering position.

Figure 58:
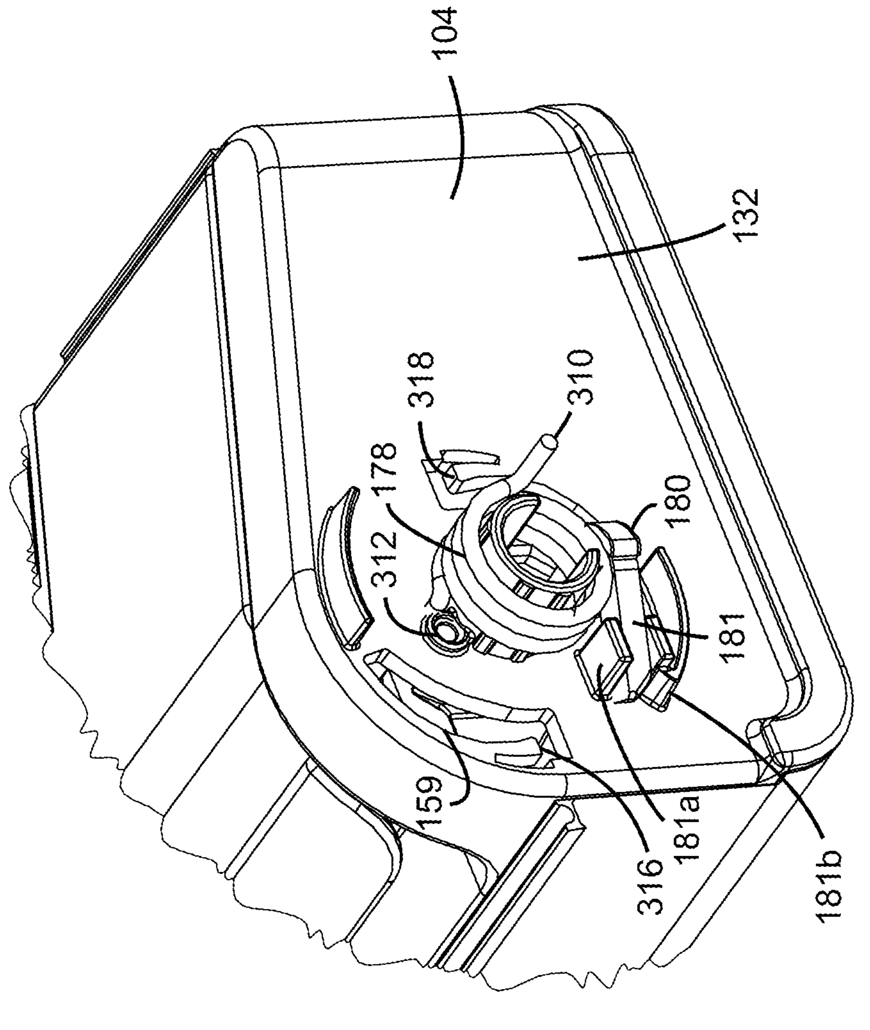
FIG. 58 is a perspective view of an enlarged portion of an end of the pill container of FIG. 57.
Figure 59:
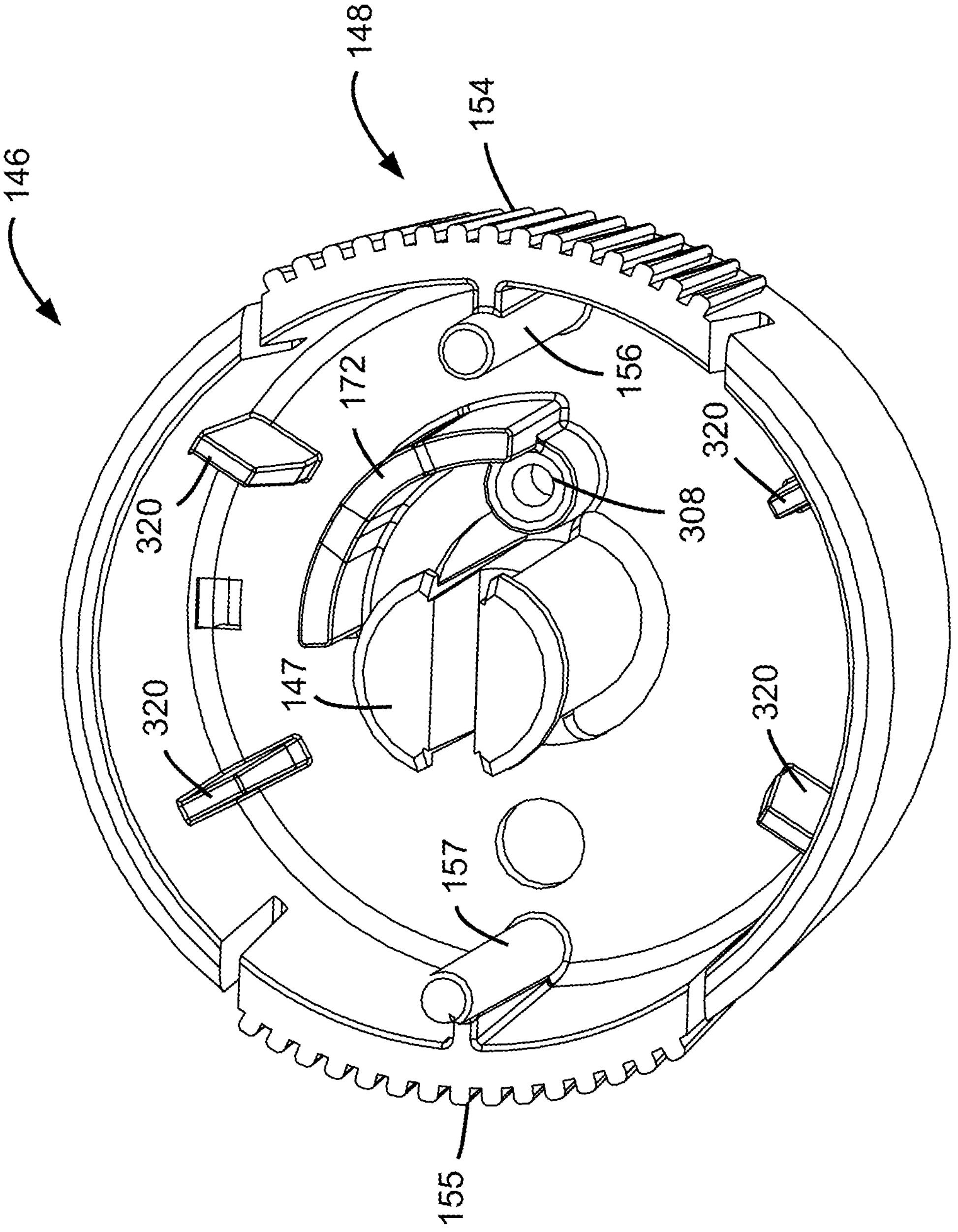
FIG. 59 is a perspective view of a knob used with the pill container of FIG. 54.

Still in reference to FIG. 58, the side wall 132 further includes spring-return projections 316, 318. Preferably, the projections 316, 318 are molded in with the rest of the base 102. The projection 316 protrudes into the channel 159, while the projection 318 protrudes into the channel 158. The projections 316, 318 act as a molded in flexible spring to help the spring 178 return to the fixed position, which returns the knob 146 to the fixed position, moving the lock bar 140 from its unlocked position to a locked position.

In the embodiment of FIGS. 11-50, a molded in flexible tab 179 (FIGS. 27, 29, and 38-40) on the knob 146 acts as spring to force the knob 146 back to the fixed position.

In FIGS. 11-29, the base 102 has a slot 176 (FIG. 12) in the sidewall 132, which receives the tab 179. When the knob 146 is rotated, the tab 179 flexes within the slot 176, and acts as a spring to move the knob 146 back to the original, fixed position. This slot 176 engaging with the tab 179 can be implemented in any embodiment.

Figure 38:
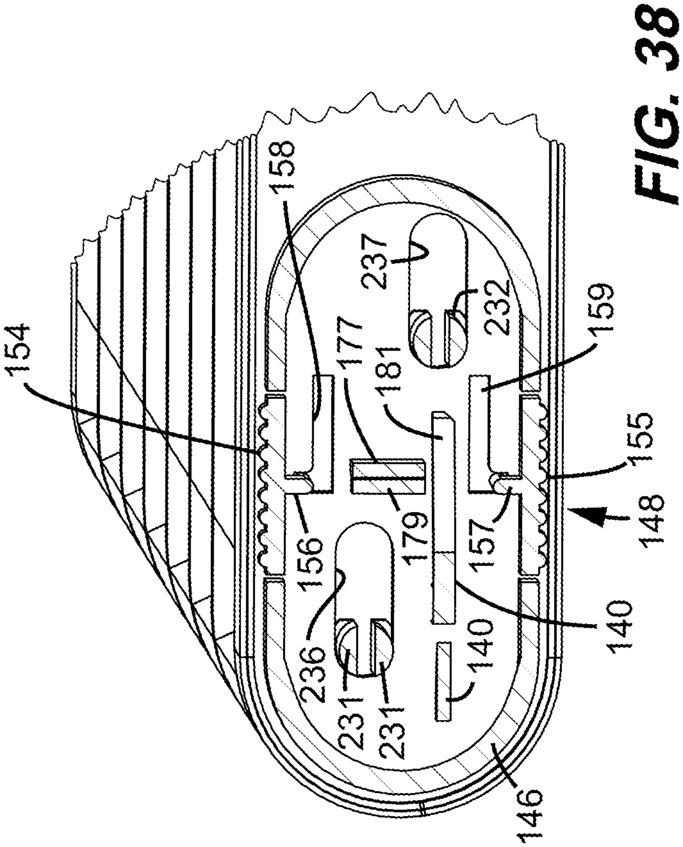
FIG. 38 is cross-sectional view taken along the line 38-38 of FIG. 37.
Figure 39:
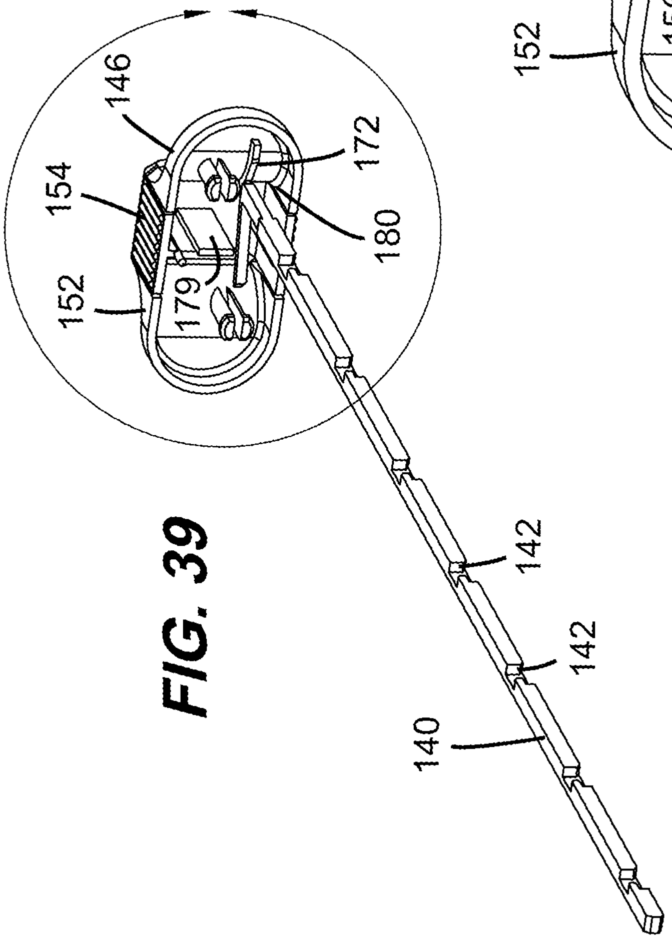
FIG. 39 is a perspective view showing the lock bar and knob of the container of FIG. 30.
Figure 40:
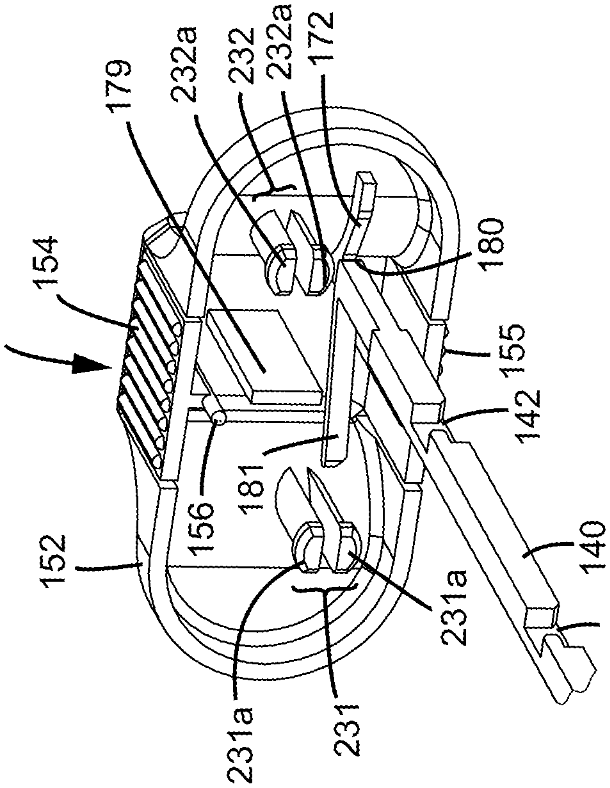
FIG. 40 is an enlarged view of section A of FIG. 39.
Figure 41:
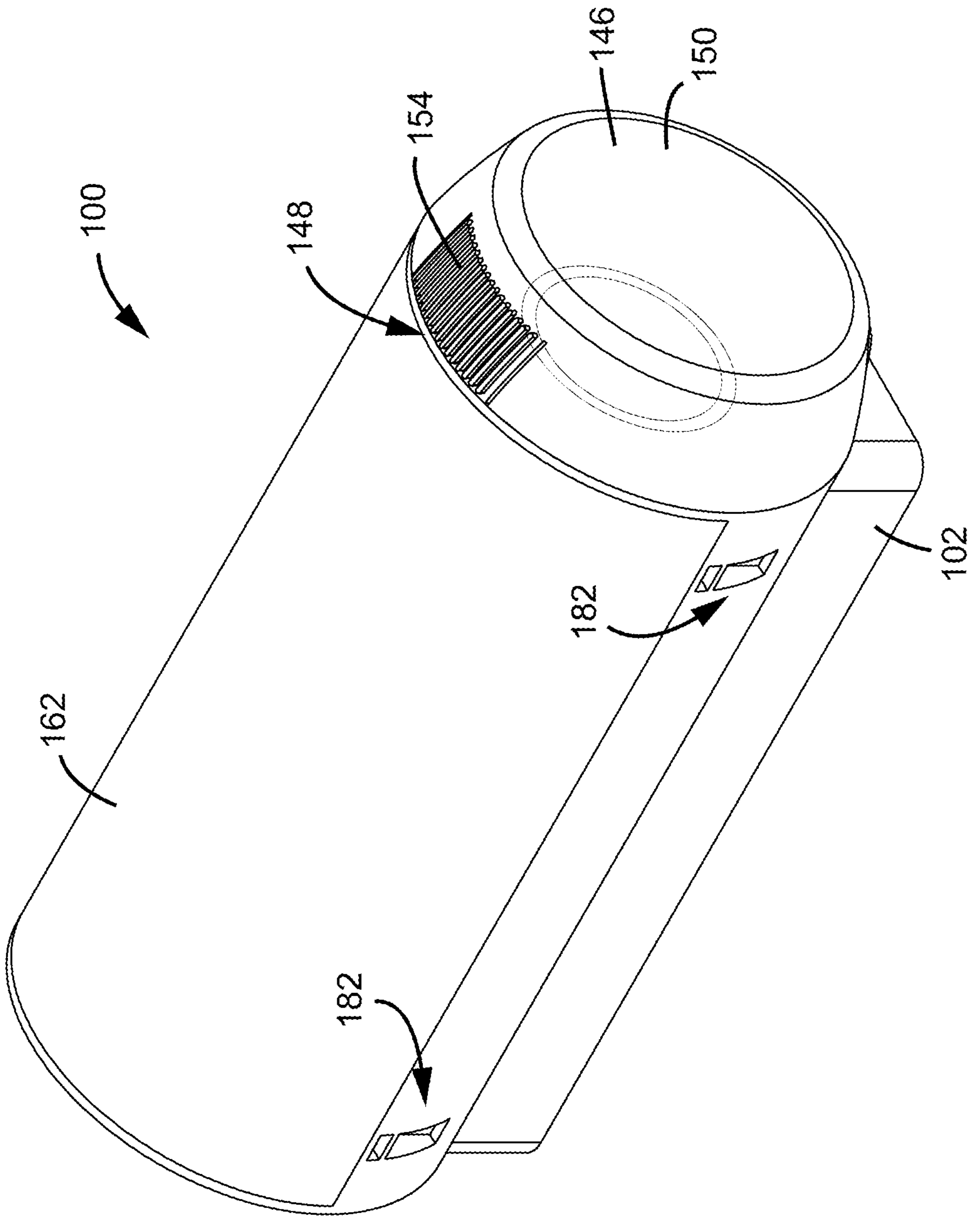
FIG. 41 is a perspective view of a fourth embodiment of a container, constructed in accordance with principles of this disclosure.
Figure 42:
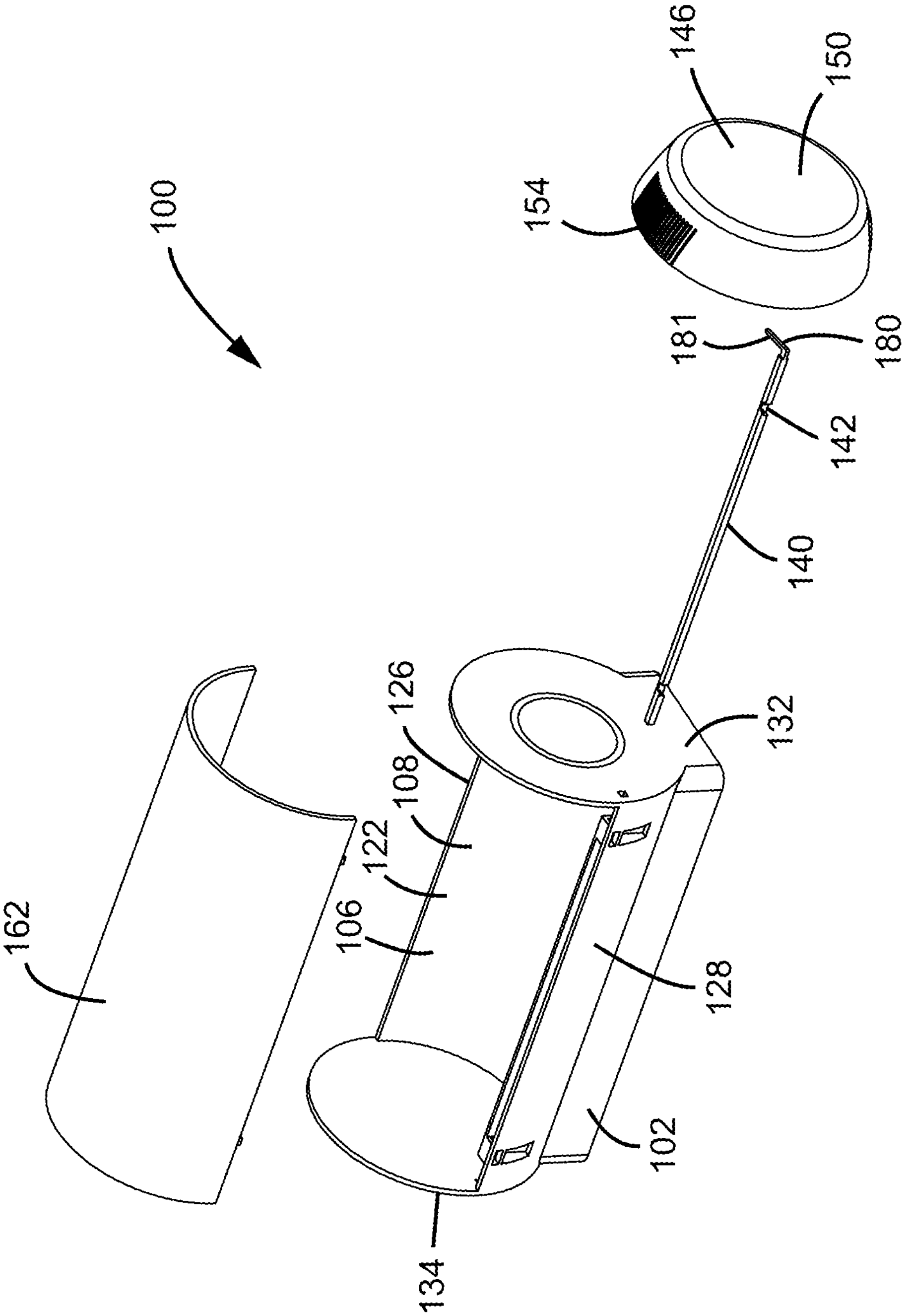
FIG. 42 is an exploded perspective view of the container of FIG. 41.
Figure 43:
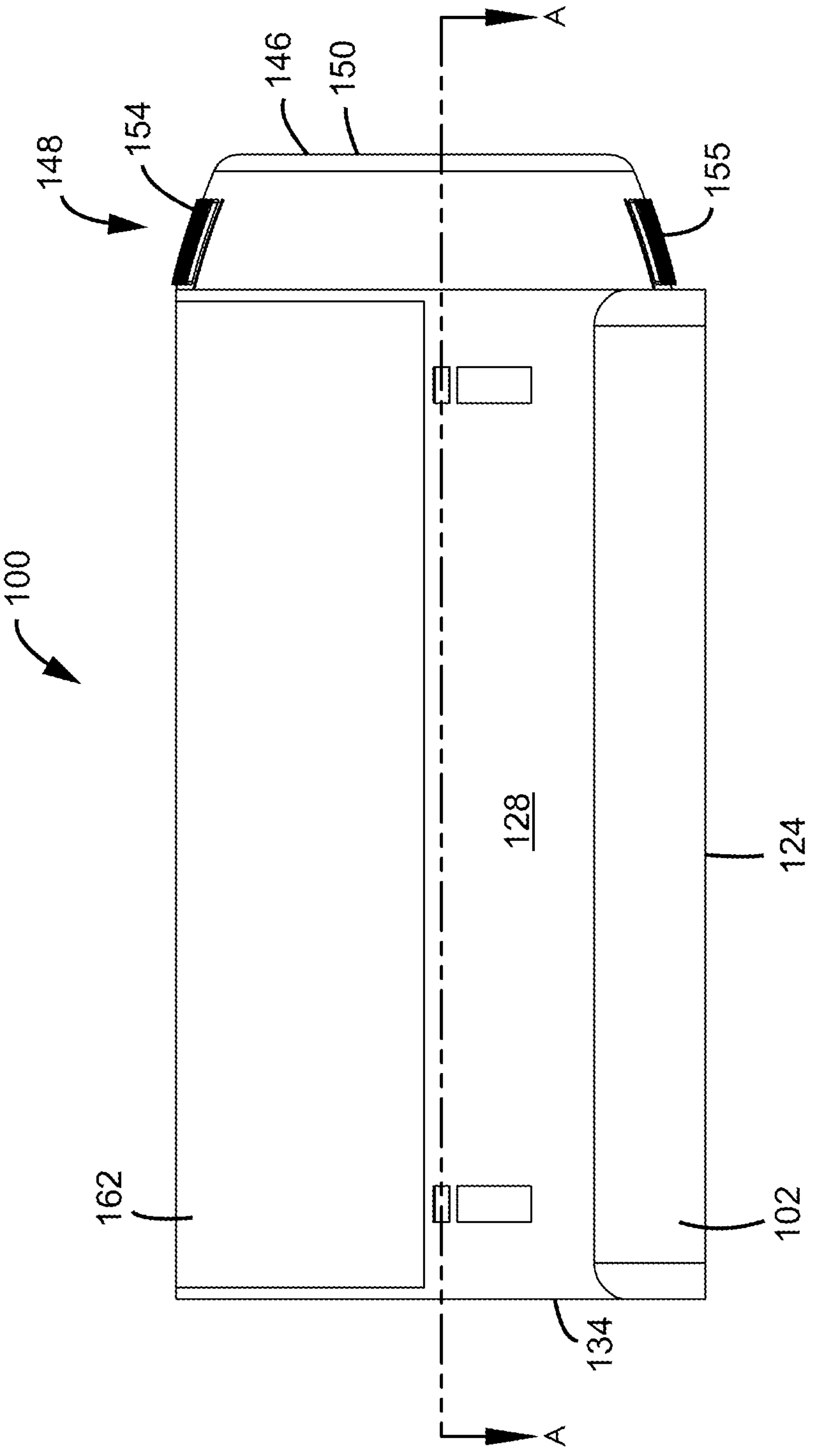
FIG. 43 is a front view of the container of FIG. 41.
Figure 44:
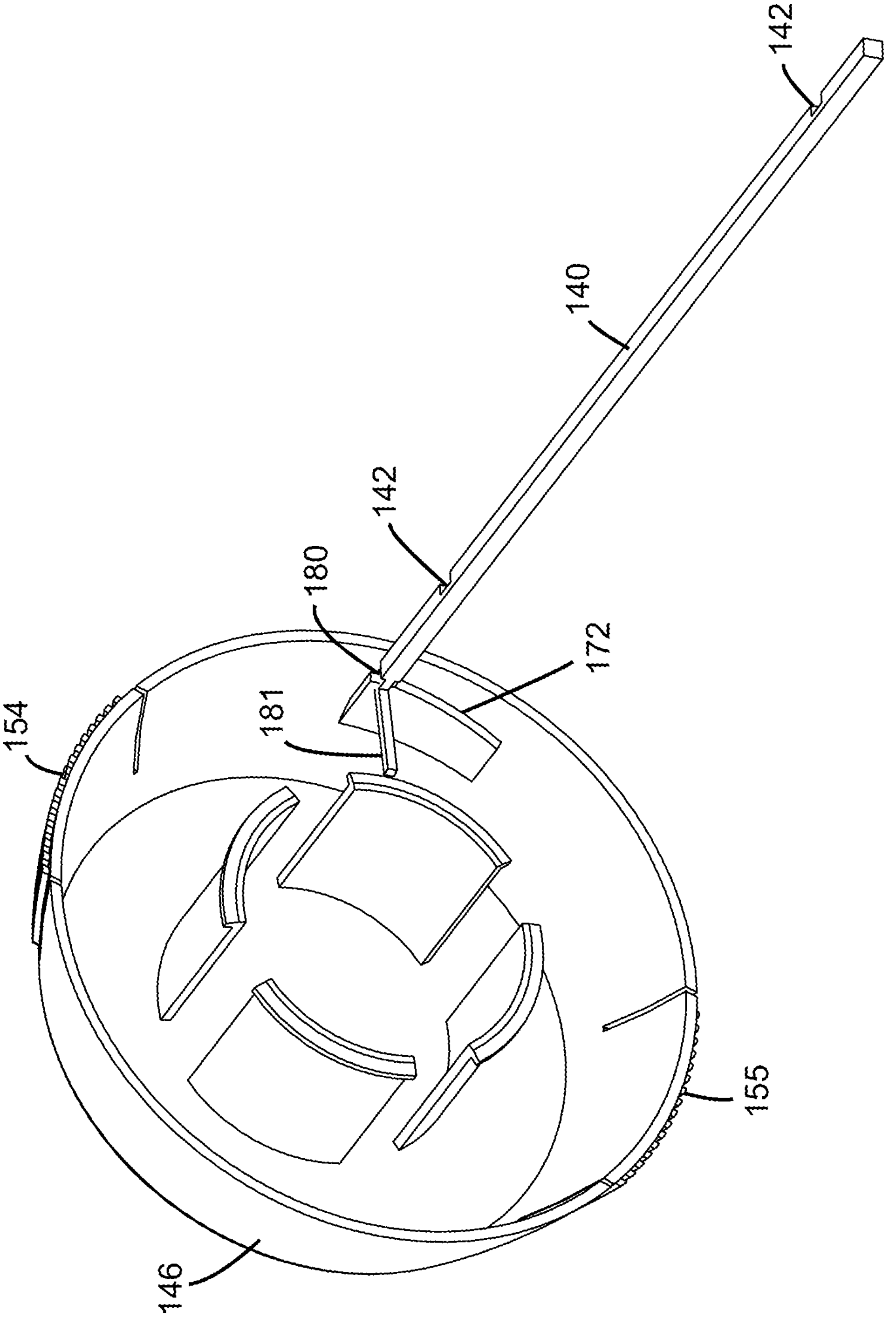
FIG. 44 is a perspective view of the knob and lock bar of the container of FIG. 41.
Figure 45:
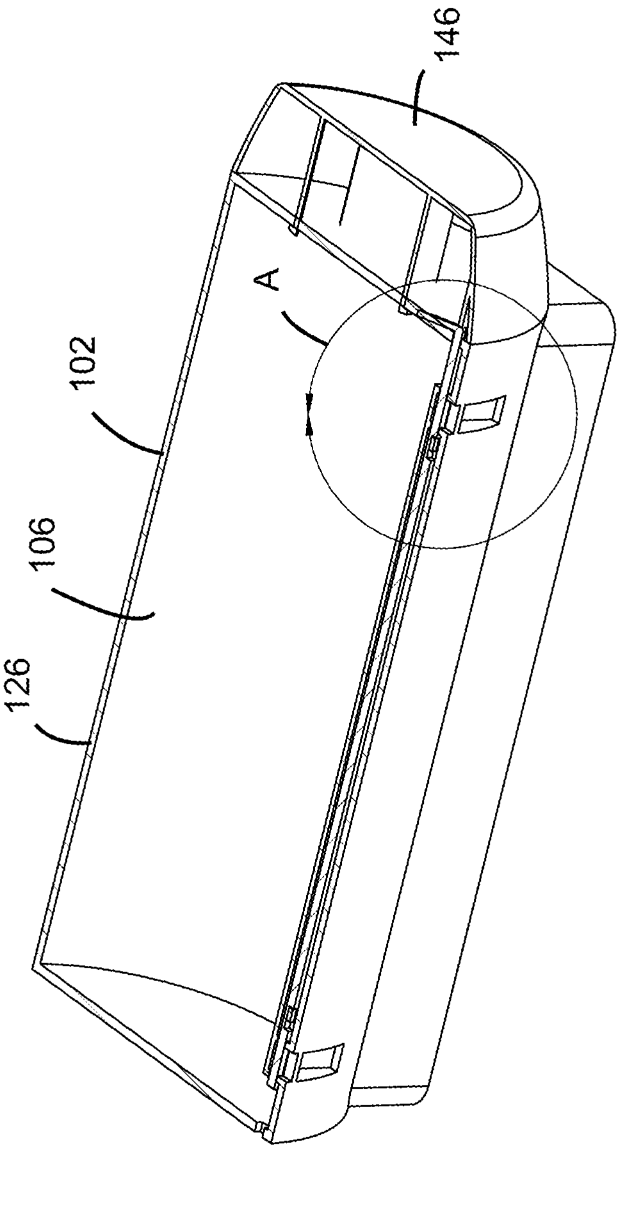
FIG. 45 is a cross-sectional view taken along the line A-A of FIG. 43 and showing the locked bar in a locked position.
Figure 46:
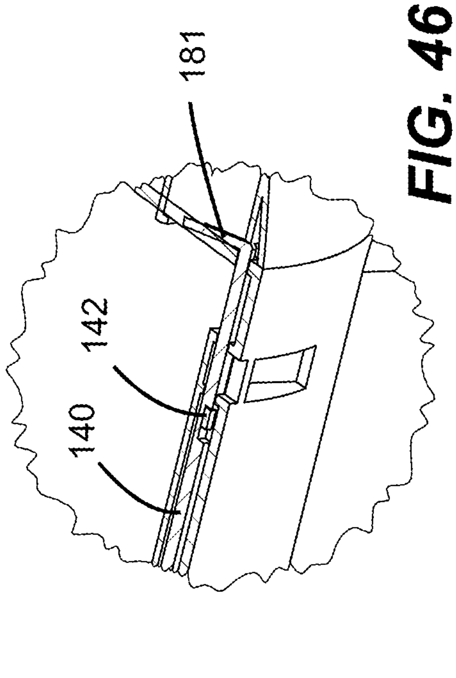
FIG. 46 is an enlarged view of section A of FIG. 45.
Figure 47:
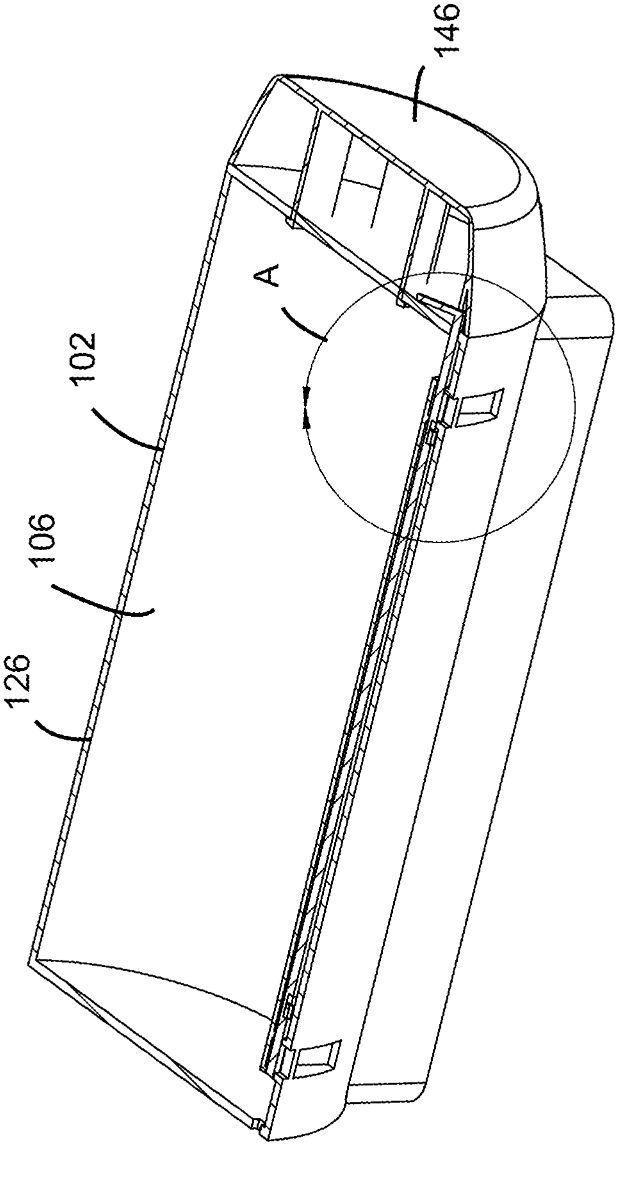
FIG. 47 is a cross-sectional view similar to FIG. 45 and showing the lock bar in an unlocked position.

In FIGS. 30-40, the base has a flexible tab 177 projecting from the sidewall 132. The tab 177 interacts with tab 179 (FIGS. 38-40). When the slide tab 152 is moved, the tabs 177, 179 engage and flex, such that the slide tab 152 is returned back to the original fixed position.

In the embodiment of FIGS. 41-50, it should be understood that the knob 146 can have the same features as the other embodiments, and the spring tab 179/or torsion spring 178 are omitted; also omitted are the ribs 156, 157.

Also shown in FIG. 59, the knob 146 includes, optionally, a plurality of ribs 320 extending/projecting internally. The ribs 320 contribute to strength and rigidity of the knob 146.

Example Operation

The pill container 100 can be used to: (i) prevent children from accessing the contents of compartments in the pill container 100; (ii) after opening one container by releasing a lid 162, automatically locking all non-open lids 162; and (iii) to close any open lid 162, requiring the actuator to be moved into an “unlock position” first.

The container 100 can be used as follows: when the container 100 is locked with the lids 162 covering the cavities 106, the knob 146 is grasped and moved from its fixed (locked) position by using the squeeze actuator 148. The squeeze actuator 148 is squeezed by pressing the knurled surfaces 154, 155 toward each other. This squeeze action will allow the knob 146 to move out of its fixed position and move. In the embodiments of FIGS. 1-29 and 41-50, this motion of the knob 146 is rotation, while in the embodiment of FIGS. 30-40, the motion of the knob 146 is a sliding linear motion. The motion of the knob 146 moves the lock bar 140 from its locked position to an unlocked position. While the lock bar 140 is in the unlocked position, one or more of the lids 162 can be unlatched and lifted from their closed position to an open position, by applying a pulling (or lifting) force to the selected lid(s) 162 and releasing engagement of the secondary latch arrangement 210 of the selected lid(s) 162. When the knob 146 is released, a spring action returns the knob 146 back to the fixed (locked) position, moving the lock bar 140 back into the locked position, and any lids 162 still in the closed position are again locked in place. When the lock bar 140 is moved to the unlocked position, the flange 181 presses against the side wall 132 of the base, and when the knob 146 is released, the lock bar 140 moves back to the locked position by the flange 181 acting as a cantilevered spring that forces the lock bar 140 to return to the locked position.

When moving the knob 146 to move the lock bar 140 from a locked position to an unlocked position, this will controls locking and unlocking of all of the lids 162 to the base 102.

When moving the lid 162 from the open position to the closed position, the knob 146 is actuated to move the lock bar 140 from the locked position to the unlocked position; and then while still grasping the knob 146, the lid 162 is moved from the open position to the closed position. The knob 146 is released, and the lid 162 is locked into the closed position.

Among the advantages of these various embodiments, it should be appreciated, as shown in FIG. 51, that the container 100 can be made in a single, molded piece including the lid 162, base 102, pill compartment/cavity 106/subcavity 110, and bottom 124 with feet 222. This one-piece molded design prevents the user from getting access to the locking bar 140, keeping it safe and child-resistant. The one-piece molded design also contributes to making assembly of the overall container 100 easy, with easy addition of the knob 146 with spring 178/179.

The above represents example principles. Many embodiments can be made using these principles.

What is claimed is:

1. A container comprising:

(a) a base having surrounding wall defining a cavity with an interior volume;

(b) a lid pivotably attached to the base and sized to removably cover the cavity so that the lid is movable between a closed position covering the cavity and an open position exposing the cavity;

(c) a locking mechanism to control locking and unlocking of the lid to the base; and (d) an actuator to move the locking mechanism from the locked position to unlocked position;

wherein:

(i) the container includes a plurality of subcavities within the base, and a plurality of lids; one lid for each of the subcavities;

(ii) the locking mechanism controls locking and unlocking of all of the lids to the base; and (iii) the actuator biases the locking mechanism into the locked position, such that when released, the actuator locks all lids that are covering their respective subcavity.

2. The container of claim 1 wherein the actuator is constructed and arranged such that, to move one of the lids from the open position to the closed position, the actuator must be moved against the bias into the unlocking position.

3. The container of claim 2 wherein:

(a) the lid has a first member of a hook and catch arrangement to selectively secure the lid to the base, when the lid is in the closed position, and selectively release the lid from the base;

(b) the base has a second member of a hook and catch arrangement to selectively secure the lid to the base, when the lid is in the closed position, and selectively release the lid from the base;

(c) the locking mechanism comprises a lock bar slidably engaging with the second member of the hook and catch arrangement; the lock bar movable between a locked position locking the lid to a secure position to the base, and an unlocked position allowing the lid to be released from the base; and (d) the actuator comprises a knob having a squeeze actuator to release the knob from a fixed position to allow the knob to move and push on the lock bar to urge the lock bar from the locked position to unlocked position.

4. The container of claim 3 wherein the knob moves rotationally after released from the fixed position.

5. The container of claim 3 wherein the knob slides linearly after released from the fixed position.

6. The container of claim 3 wherein the knob includes a spring that returns the knob to the fixed position.

7. The container of claim 3 wherein:

(a) the knob includes an internal ramp; and (b) the lock bar engages against the ramp as the knob is moved from the fixed position resulting in the lock bar sliding in a direction parallel to a longitudinal axis of the base to the unlocked position.

8. The container of claim 7 wherein the lock bar includes an end flange constructed and arranged to compress against the base, when the lock bar is moved to the unlocked position, and uncompress to return the lock bar to the locked position when the knob returns to the fixed position.

9. The container of claim 3 wherein:

(a) the lock bar includes at least one notch corresponding to each hook and catch arrangement; and (b) when the lock bar is in the locked position, the notch is engaged with a projection on one of the first or second members of the hook and catch arrangement, and when the lock bar is in the unlocked position, the notch is free of engagement with the projection.

10. The container of claim 3 wherein the squeeze actuator includes a pair of opposite outwardly facing grip surfaces; and a pair of inwardly extending ribs.

11. The container of claim 1 wherein the base and lid are each shaped to be a partial cylinder.

12. A method of opening a container locked closed with a lock bar; the method comprising:

(a) grasping a knob and moving the knob from a fixed position to a released position by squeezing a squeeze actuator on the knob;

(b) moving the knob to move the lock bar from a locked position to an unlocked position; and (c) while still grasping the knob, moving a lid from a closed position to an open position to expose an open cavity in the container.

13. The method of claim 12 wherein the step of moving a lid includes lifting the lid to release engagement of a secondary latch arrangement between the lid and a base of the container.

14. The method of claim 12 wherein the step of moving the knob includes rotating the knob.

15. The method of claim 12 wherein the step of moving the knob includes linearly moving the knob.

16. The method of claim 15 wherein the step of linearly moving the knob includes sliding the knob relative to a sidewall of the container.

17. The method of claim 12 further comprising releasing the knob and permitting the knob to spring back to the fixed position, and permitting the lock bar to spring back to the locked position.

18. The method of claim 12 wherein:

(a) the container includes a plurality of subcavities and a plurality of lids; one lid for each of the subcavities; and (b) the step of moving the knob to move the lock bar from a locked position to an unlocked position controls locking and unlocking of all of the lids to the base.

19. The method of claim 18 further including:

(a) moving the lid from the open position to the closed position by moving the knob to move the lock bar from the locked position to the unlocked position; and (b) while still grasping the knob, moving the lid from the open position to the closed position.

* * * * *